US011987269B2

(12) United States Patent
Baker et al.

(10) Patent No.: US 11,987,269 B2
(45) Date of Patent: May 21, 2024

(54) SAFE NON-CONSERVATIVE PLANNING FOR AUTONOMOUS VEHICLES

(71) Applicant: isee, Cambridge, MA (US)

(72) Inventors: Chris L. Baker, Pittsburgh, PA (US); Hung-Jui Huang, Cambridge, MA (US); Yibiao Zhao, Cambridge, MA (US); Michal Cap, Watertown, MA (US); Kai-Chi Huang, Cambridge, MA (US)

(73) Assignee: isee, Cambridge, MA (US)

( * ) Notice: Subject to any disclaimer, the term of this patent is extended or adjusted under 35 U.S.C. 154(b) by 195 days.

(21) Appl. No.: 17/514,197

(22) Filed: Oct. 29, 2021

(65) Prior Publication Data

US 2022/0135076 A1     May 5, 2022

Related U.S. Application Data

(60) Provisional application No. 63/107,958, filed on Oct. 30, 2020.

(51) Int. Cl.
*B60W 60/00*     (2020.01)
*B60W 50/14*     (2020.01)
*G01C 21/34*     (2006.01)

(52) U.S. Cl.
CPC ........ *B60W 60/0015* (2020.02); *B60W 50/14* (2013.01); *B60W 60/0011* (2020.02); *G01C 21/343* (2013.01)

(58) Field of Classification Search
CPC ............ B60W 60/0015; B60W 50/14; B60W 60/0011; B60W 2754/10; B60W 30/18145; B60W 30/18154; G01C 21/343; G01C 21/3453
See application file for complete search history.

(56) References Cited

U.S. PATENT DOCUMENTS 11,441,916 B1 * 9/2022 Konrardy ................ H04W 4/40
2018/0208195 A1 * 7/2018 Hutcheson ............ B60W 50/14

* cited by examiner

*Primary Examiner* — Anne Marie Antonucci
*Assistant Examiner* — Jewel Ashley Kuntz
(74) *Attorney, Agent, or Firm* — Lando & Anastasi, LLP

(57) ABSTRACT

Techniques for safe non-conservative planning include: obtaining a risk budget constraining a plan for an autonomous vehicle to satisfy an objective; based at least on the risk budget and the objective, planning a trajectory of the autonomous vehicle toward the objective, at least by: (a) determining a risk cost associated with an initial planned action of the trajectory, (b) based at least on the risk cost, determining whether the trajectory is feasible or infeasible within the risk budget, and (c) responsive to determining that the trajectory is feasible within the risk budget, executing the initial planned action; decreasing the risk budget by the risk cost, to obtain a remaining risk budget; obtaining state data corresponding to a state of the autonomous vehicle after executing the initial planned action; and based at least on the state data, the remaining risk budget, and the objective, planning another trajectory toward the objective.

45 Claims, 9 Drawing Sheets

```
Algorithm 1: RB-RHC
   Input: b_0, ρ_0, δ, Maximum Time Horizon T
1  b ← b_0; ρ ← ρ_0;
2  repeat T times
3  |   Solve (12) with b_k = b, ρ_k = ρ for u_k^*;
4  |   if (12) has solution with b_k = b, ρ_k = ρ then
5  |   |   ρ ← ρ − g_b(f_b^{OL}(b, u_k^*)) − g_b^{stop}(f_b^{OL}(b, u_k^*));
6  |   else
7  |   |   if b ∉ 𝔹^{stop} then
8  |   |   |   u_k^* = u_{stop};
9  |   |   else
10 |   |   |   u_k^* = NO − OP;
11 |   Execute u_k^*;
12 |   ρ ← ρ + δ;
13 |   Receive new observation y_k;
14 |   b ← f_b(b, u_k^*, y_k);
```

FIG. 4

SAFE NON-CONSERVATIVE PLANNING FOR AUTONOMOUS VEHICLES

CROSS-REFERENCE TO RELATED APPLICATION

This application claims the benefit of U.S. Provisional Patent Application Ser. No. 63/107,958, titled "SAFE NON-CONSERVATIVE PLANNING FOR AUTONOMOUS VEHICLES," filed Oct. 30, 2020, which is hereby incorporated by reference.

BACKGROUND

An autonomous agent is a set of hardware and/or software configured to control a physical mechanism. A device under control of an autonomous agent may be referred to as a "robot," an "autonomous vehicle," and/or another such term. For example, a vehicle (e.g., automobile, aircraft, or water vehicle) may include an autonomous agent that controls steering, braking, acceleration, and/or some other physical mechanism of the vehicle, allowing the vehicle to be wholly or partially self-driving. Many different kinds of autonomous agents exist. An autonomous agent receives information about the physical environment from one or more sensors and uses the information to help determine how to control the physical mechanism. For example, if data from a sensor indicates an obstruction in the path of a self-driving vehicle, an autonomous agent may instruct the vehicle to brake and/or turn.

Approaches described in this section have not necessarily been conceived and/or pursued prior to the filing of this application. Accordingly, unless otherwise indicated, approaches described in this section should not be construed as prior art.

TECHNICAL FIELD

The present disclosure relates generally to planning for autonomous vehicles.

SUMMARY

In general, in one aspect, one or more non-transitory computer-readable media store instructions that, when executed by one or more processors, cause the one or more processors to perform operations including: obtaining a first risk budget constraining a first plan for an autonomous vehicle to satisfy a first objective; based at least on the first risk budget and the first objective, planning a first planned trajectory of the autonomous vehicle toward the first objective, at least by: (a) determining a first risk cost associated with a first initial planned action of the first planned trajectory, (b) based at least on the first risk cost, determining whether the first planned trajectory is feasible or infeasible within the first risk budget, and (c) responsive to determining that the first planned trajectory is feasible within the first risk budget, executing the first initial planned action of the first planned trajectory; decreasing the first risk budget by the first risk cost associated with the first initial planned action, to obtain a first remaining risk budget; obtaining first state data corresponding to a state of the autonomous vehicle after executing the first initial planned action of the first planned trajectory; and based at least on the first state data, the first remaining risk budget, and the first objective, planning a second trajectory of the autonomous vehicle toward the first objective.

The operations may further include: incrementing the first remaining risk budget to cover an interval risk bound.

Planning the second trajectory of the autonomous vehicle toward the first objective may include: (a) determining a second risk cost associated with a second initial planned action of the second planned trajectory, (b) based at least on the second risk cost, determining whether the second planned trajectory is feasible or infeasible within the first remaining risk budget, an (c) responsive to determining that the second planned trajectory is infeasible within the first remaining risk budget, executing a remedial action and refraining from executing the second initial planned action. The remedial action may include an emergency stop. The emergency stop may be designed to satisfy a passive safety constraint associated with the autonomous vehicle, by which the autonomous vehicle is stationary in the event of a collision.

Determining whether the first planned trajectory is feasible or infeasible within the first risk budget may include determining whether or not, if the first initial planned action is executed, an emergency stop can be executed within the first remaining risk budget.

Planning the second trajectory of the autonomous vehicle toward the first objective may include: (a) determining a second risk cost associated with a second initial planned action of the second planned trajectory, (b) based at least on the second risk cost, determining whether the second planned trajectory is feasible or infeasible within the first remaining risk budget, and (c) responsive to determining that the second planned trajectory is feasible within the first remaining risk budget, executing the second initial planned action of the second planned trajectory. The operations may further include: decreasing the first remaining risk budget by the second risk cost associated with the second initial planned action, to obtain a second remaining risk budget; obtaining second state data corresponding to a state of the autonomous vehicle after executing the second initial planned action of the second planned trajectory; and based at least on the second state data, the second remaining risk budget, and the first objective, planning a third trajectory of the autonomous vehicle toward the first objective.

The operations may further include: iteratively reducing the first remaining risk budget by risk costs associated with executed actions, until the autonomous vehicle satisfies the first objective or is unable to proceed toward the first objective within the remaining risk budget.

The operations may further include: determining a second risk budget constraining a second plan for the autonomous vehicle to satisfy a second objective; and upon satisfying the first objective, increasing the second risk budget by an unallocated amount of the first remaining risk budget.

The operations may further include: computing a safety evaluation metric for the autonomous vehicle, based at least on the first objective and an amount of the first risk budget used toward satisfying the first objective.

The operations may further include: based at least on the first remaining risk budget, generating a safety alert.

The first objective may include a route plan, and executing the first initial planned action may include defining a waypoint in multiple waypoints of the route plan.

The first objective may include a physical destination, and executing the first initial planned action may include applying a control to the autonomous vehicle.

The first risk budget may constrain the first plan for the autonomous vehicle to a threshold probability of one or more kinds of safety violations over one or more of travel distance of the autonomous vehicle or travel time of the autonomous vehicle.

In general, in one aspect, a system includes one or more processors, and one or more non-transitory computer-readable media storing instructions that, when executed by one or more processors, cause the one or more processors to perform operations including: obtaining a first risk budget constraining a first plan for an autonomous vehicle to satisfy a first objective; based at least on the first risk budget and the first objective, planning a first planned trajectory of the autonomous vehicle toward the first objective, at least by: (a) determining a first risk cost associated with a first initial planned action of the first planned trajectory, (b) based at least on the first risk cost, determining whether the first planned trajectory is feasible or infeasible within the first risk budget, and (c) responsive to determining that the first planned trajectory is feasible within the first risk budget, executing the first initial planned action of the first planned trajectory; decreasing the first risk budget by the first risk cost associated with the first initial planned action, to obtain a first remaining risk budget; obtaining first state data corresponding to a state of the autonomous vehicle after executing the first initial planned action of the first planned trajectory; and based at least on the first state data, the first remaining risk budget, and the first objective, planning a second trajectory of the autonomous vehicle toward the first objective.

The operations may further include: incrementing the first remaining risk budget to cover an interval risk bound.

Planning the second trajectory of the autonomous vehicle toward the first objective may include: (a) determining a second risk cost associated with a second initial planned action of the second planned trajectory, (b) based at least on the second risk cost, determining whether the second planned trajectory is feasible or infeasible within the first remaining risk budget, an (c) responsive to determining that the second planned trajectory is infeasible within the first remaining risk budget, executing a remedial action and refraining from executing the second initial planned action. The remedial action may include an emergency stop. The emergency stop may be designed to satisfy a passive safety constraint associated with the autonomous vehicle, by which the autonomous vehicle is stationary in the event of a collision.

Determining whether the first planned trajectory is feasible or infeasible within the first risk budget may include determining whether or not, if the first initial planned action is executed, an emergency stop can be executed within the first remaining risk budget.

Planning the second trajectory of the autonomous vehicle toward the first objective may include: (a) determining a second risk cost associated with a second initial planned action of the second planned trajectory, (b) based at least on the second risk cost, determining whether the second planned trajectory is feasible or infeasible within the first remaining risk budget, and (c) responsive to determining that the second planned trajectory is feasible within the first remaining risk budget, executing the second initial planned action of the second planned trajectory. The operations may further include: decreasing the first remaining risk budget by the second risk cost associated with the second initial planned action, to obtain a second remaining risk budget; obtaining second state data corresponding to a state of the autonomous vehicle after executing the second initial planned action of the second planned trajectory; and based at least on the second state data, the second remaining risk budget, and the first objective, planning a third trajectory of the autonomous vehicle toward the first objective.

The operations may further include: iteratively reducing the first remaining risk budget by risk costs associated with executed actions, until the autonomous vehicle satisfies the first objective or is unable to proceed toward the first objective within the remaining risk budget.

The operations may further include: determining a second risk budget constraining a second plan for the autonomous vehicle to satisfy a second objective; and upon satisfying the first objective, increasing the second risk budget by an unallocated amount of the first remaining risk budget.

The operations may further include: computing a safety evaluation metric for the autonomous vehicle, based at least on the first objective and an amount of the first risk budget used toward satisfying the first objective.

The operations may further include: based at least on the first remaining risk budget, generating a safety alert.

The first objective may include a route plan, and executing the first initial planned action may include defining a waypoint in multiple waypoints of the route plan.

The first objective may include a physical destination, and executing the first initial planned action may include applying a control to the autonomous vehicle.

The first risk budget may constrain the first plan for the autonomous vehicle to a threshold probability of one or more kinds of safety violations over one or more of travel distance of the autonomous vehicle or travel time of the autonomous vehicle.

In general, in one aspect, a method includes: obtaining a first risk budget constraining a first plan for an autonomous vehicle to satisfy a first objective; based at least on the first risk budget and the first objective, planning a first planned trajectory of the autonomous vehicle toward the first objective, at least by: (a) determining a first risk cost associated with a first initial planned action of the first planned trajectory, (b) based at least on the first risk cost, determining whether the first planned trajectory is feasible or infeasible within the first risk budget, and (c) responsive to determining that the first planned trajectory is feasible within the first risk budget, executing the first initial planned action of the first planned trajectory; decreasing the first risk budget by the first risk cost associated with the first initial planned action, to obtain a first remaining risk budget; obtaining first state data corresponding to a state of the autonomous vehicle after executing the first initial planned action of the first planned trajectory; and based at least on the first state data, the first remaining risk budget, and the first objective, planning a second trajectory of the autonomous vehicle toward the first objective.

The method may further include: incrementing the first remaining risk budget to cover an interval risk bound.

Planning the second trajectory of the autonomous vehicle toward the first objective may include: (a) determining a second risk cost associated with a second initial planned action of the second planned trajectory, (b) based at least on the second risk cost, determining whether the second planned trajectory is feasible or infeasible within the first remaining risk budget, an (c) responsive to determining that the second planned trajectory is infeasible within the first remaining risk budget, executing a remedial action and refraining from executing the second initial planned action. The remedial action may include an emergency stop. The emergency stop may be designed to satisfy a passive safety constraint associated with the autonomous vehicle, by which the autonomous vehicle is stationary in the event of a collision.

Determining whether the first planned trajectory is feasible or infeasible within the first risk budget may include determining whether or not, if the first initial planned action is executed, an emergency stop can be executed within the first remaining risk budget.

Planning the second trajectory of the autonomous vehicle toward the first objective may include: (a) determining a second risk cost associated with a second initial planned action of the second planned trajectory, (b) based at least on the second risk cost, determining whether the second planned trajectory is feasible or infeasible within the first remaining risk budget, and (c) responsive to determining that the second planned trajectory is feasible within the first remaining risk budget, executing the second initial planned action of the second planned trajectory. The operations may further include: decreasing the first remaining risk budget by the second risk cost associated with the second initial planned action, to obtain a second remaining risk budget; obtaining second state data corresponding to a state of the autonomous vehicle after executing the second initial planned action of the second planned trajectory; and based at least on the second state data, the second remaining risk budget, and the first objective, planning a third trajectory of the autonomous vehicle toward the first objective.

The method may further include: iteratively reducing the first remaining risk budget by risk costs associated with executed actions, until the autonomous vehicle satisfies the first objective or is unable to proceed toward the first objective within the remaining risk budget.

The method may further include: determining a second risk budget constraining a second plan for the autonomous vehicle to satisfy a second objective; and upon satisfying the first objective, increasing the second risk budget by an unallocated amount of the first remaining risk budget.

The method may further include: computing a safety evaluation metric for the autonomous vehicle, based at least on the first objective and an amount of the first risk budget used toward satisfying the first objective.

The method may further include: based at least on the first remaining risk budget, generating a safety alert.

The first objective may include a route plan, and executing the first initial planned action may include defining a waypoint in multiple waypoints of the route plan.

The first objective may include a physical destination, and executing the first initial planned action may include applying a control to the autonomous vehicle.

The first risk budget may constrain the first plan for the autonomous vehicle to a threshold probability of one or more kinds of safety violations over one or more of travel distance of the autonomous vehicle or travel time of the autonomous vehicle.

One or more embodiments described in this Specification and/or recited in the claims may not be included in this General Overview section.

BRIEF DESCRIPTION OF THE DRAWINGS

Various aspects of at least one embodiment are discussed below with reference to the accompanying Figures, which are not intended to be drawn to scale. The Figures are included to provide illustration and a further understanding of the various aspects and embodiments, and are incorporated in and constitute a part of this specification, but are not intended to define the limits of the disclosure. In the Figures, each identical or nearly identical component that is illustrated in various Figures is represented by a like numeral. For the purposes of clarity, some components may not be labeled in every figure. In the Figures:

FIG. 4 illustrates an example of an algorithm according to an embodiment;

DETAILED DESCRIPTION

1. System Architecture

Figure 1:
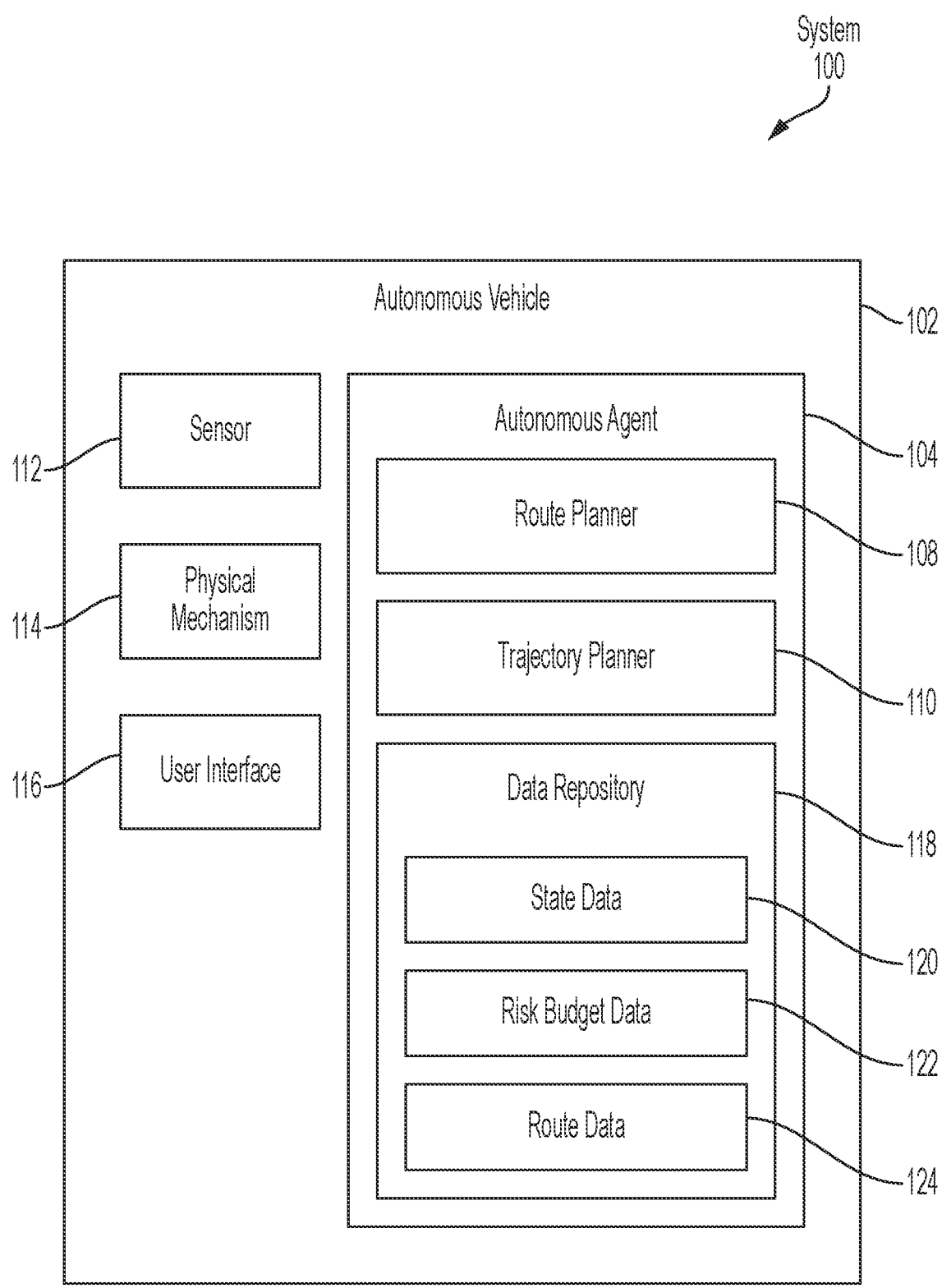
FIG. 1 is a block diagram of an example of a system according to an embodiment.

FIG. 1 is a block diagram of an example of a system 100 according to an embodiment. In an embodiment, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

As illustrated in FIG. 1, the system 100 includes an autonomous vehicle 102. The autonomous vehicle 102 may be a wholly autonomous vehicle configured to operate without any human guidance. Alternatively, the autonomous vehicle 102 may be a partially autonomous vehicle in which some aspects are automated and others remain under control of a human operator. Some examples of autonomous vehicles include, but are not limited to: a self-driving vehicle designed to transport cargo and/or passengers (e.g., a self-driving tractor-trailer used to transport cargo over roads and/or within a cargo distribution facility, a passenger vehicle used to transport occupants over roads, which may also tow a payload coupled to the passenger vehicle such as a cargo trailer, boat trailer, or camper, etc.); an aircraft (e.g., a cargo or passenger aircraft, a drone, or another kind of aircraft); a watercraft; a spacecraft; and an automated home appliance (e.g., a robotic vacuum cleaner). As used herein, the term "vehicle" should not be considered limited to craft used to transport cargo and/or passengers. The autonomous vehicle 102 includes one or more physical mechanism(s) 114 used to direct the autonomous vehicle 102's trajectory (including direction, acceleration, and/or speed), such as a steering mechanism, accelerator, brake, etc. A physical mechanism 114 may include a controller (not shown) that translates digital and/or analog instructions to physical motion (e.g., physically turning the wheels, increasing or decreasing acceleration, engaging a brake mechanism, etc.).

To help direct the autonomous vehicle 102's trajectory, the autonomous vehicle 102 includes one or more autonomous agent(s) 104 configured to control the operation of one or more of the physical mechanism(s) 114. For ease of discussion, the following description assumes a single autonomous agent 104; however, embodiments may be practiced with any number of autonomous agents 104. The autonomous agent 104 is configured to receive information about the physical environment from one or more sensors 112. For example, the sensor(s) 112 may include a radar sensor, lidar sensor, camera (i.e., configured to capture still images and/or video), microphone, thermometer, altitude sensor, global positioning system (GPS), and/or another kind of sensor configured to gather information about the physical environment. Information gathered by a sensor 112 may relate to the geospatial location of the autonomous vehicle 102, weather conditions, locations of static and/or mobile obstacles (e.g., other vehicles, pedestrians, terrain, overpasses, etc.), road markings, altitude, and/or other information relevant to the autonomous vehicle 102's location and trajectory in the physical environment. The autonomous agent 104 may store information from the sensor(s) 112 (in raw form and/or subsequent to one or more data transformations) as state data 120.

In an embodiment, the autonomous agent 104 is configured to plan routes and/or trajectories based in part on risk budget data 122. In general, a risk budget is a constraint on how much risk the autonomous vehicle 102 is allowed to take. For example, the risk budget may define a threshold risk of collision that the autonomous vehicle 102 is not permitted to meet or exceed, over a driving time and/or driving distance of the autonomous vehicle 102. As another example, the risk budget may define a threshold risk of safety violations (which may include collisions and/or other kinds of safety violations), safety failures, and/or one or more other risk factors. Risk budget data 122 may include one or more initial risk budgets for one or more routes and/or route segments. A total risk budget may be allocated over multiple routes and/or segments. For a given route or segment, the risk budget data 122 may include a remaining risk budget, i.e., an amount of risk budget that has not yet been consumed by actions executed while planning over the route or segment. The risk budget data 122 thus provides one or more predefined safety constraints that the autonomous agent 104 must adhere to.

In an embodiment, an autonomous agent 104 includes a route planner 108. Based at least in part on route data (124) and risk budget data 122, the route planner 108 is configured to plan a route for the autonomous vehicle 102. Route data 124 may include, for example, a digital map, graph, and/or other data structure(s) describing route options, such as roads and/or other infrastructure, that the autonomous vehicle 102 may follow from a planned physical starting point to a planned physical destination. Examples of operations for planning a route are described in further detail below.

In an embodiment, the autonomous agent 104 includes a trajectory planner 110. Based at least in part on state data 120 and risk budget data 122, the trajectory planner 110 is configured to plan a trajectory for the autonomous vehicle 102, i.e., a trajectory that the autonomous vehicle 102 follows along a planned route. Examples of operations for planning a trajectory are described in further detail below. Based at least on the planned trajectory, the autonomous agent 104 is configured to control operation of the physical mechanism(s) 114. For example, the autonomous agent 104 may send a signal to a steering mechanism to adjust the autonomous vehicle 102's direction, to an accelerator to increase or decrease acceleration, and/or to a braking mechanism to apply the brakes. The autonomous agent 104 may be configured to control operation of many different kinds of physical mechanisms 114 in many different ways.

The autonomous agent 104 may be configured to store data (e.g., state data 120, risk budget data 122, and/or route data 124) in a data repository 118. A data repository 118 is any type of storage unit and/or device (e.g., a file system, database, collection of tables, or any other storage mechanism) for storing data. A data repository 118 may include multiple different storage units and/or devices. The multiple different storage units and/or devices may or may not be of the same type or located at the same physical site. Further, a data repository 118 may be implemented or may execute on the same computing system as one or more other components of the system 100. Alternatively or additionally, a data repository 118 may be implemented or executed on a computing system separate from one or more other components of the system 100. A data repository 118 may be logically integrated with one or more other components of the system 100. Alternatively or additionally, a data repository 118 may be communicatively coupled to one or more other components of the system 100 via a direct connection or via a network. In FIG. 1, a data repository 118 is illustrated as storing various kinds of information. Some or all of this information may be implemented and/or distributed across any of the components of the system 100. However, this information is illustrated within the data repository 118 for purposes of clarity and explanation.

In an embodiment, a user interface 116 refers to hardware and/or software configured to facilitate communications between a user and the autonomous agent 104, for example by presenting (e.g., as an image, audio, and/or video) a safety alert to the user. The user interface 116 may be located in the autonomous vehicle 102 or remote from the autonomous vehicle 102 (e.g., in a remote system configured to monitor operation of one or more autonomous vehicles, individually and/or collectively). A user interface 116 renders user interface elements and receives input via user interface elements. A user interface 116 may be a graphical user interface (GUI), a command line interface (CLI), a haptic interface, a voice command interface, and/or any other kind of interface or combination thereof. Examples of user interface elements include checkboxes, radio buttons, dropdown lists, list boxes, buttons, toggles, text fields, date and time selectors, command lines, sliders, pages, and forms.

In an embodiment, different components of a user interface 116 are specified in different languages. The behavior of user interface elements may be specified in a dynamic programming language, such as JavaScript. The content of user interface elements may be specified in a markup language, such as hypertext markup language (HTML), Extensible Markup Language (XML), or XML User Interface Language (XUL). The layout of user interface elements may be specified in a style sheet language, such as Cascading Style Sheets (CSS). Alternatively or additionally, aspects of a user interface 116 may be specified in one or more other languages, such as Java, Python, Perl, C, C++, and/or any other language or combination thereof.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

2. Example Operations for Safe Non-Conservative Planning

Figure 2:
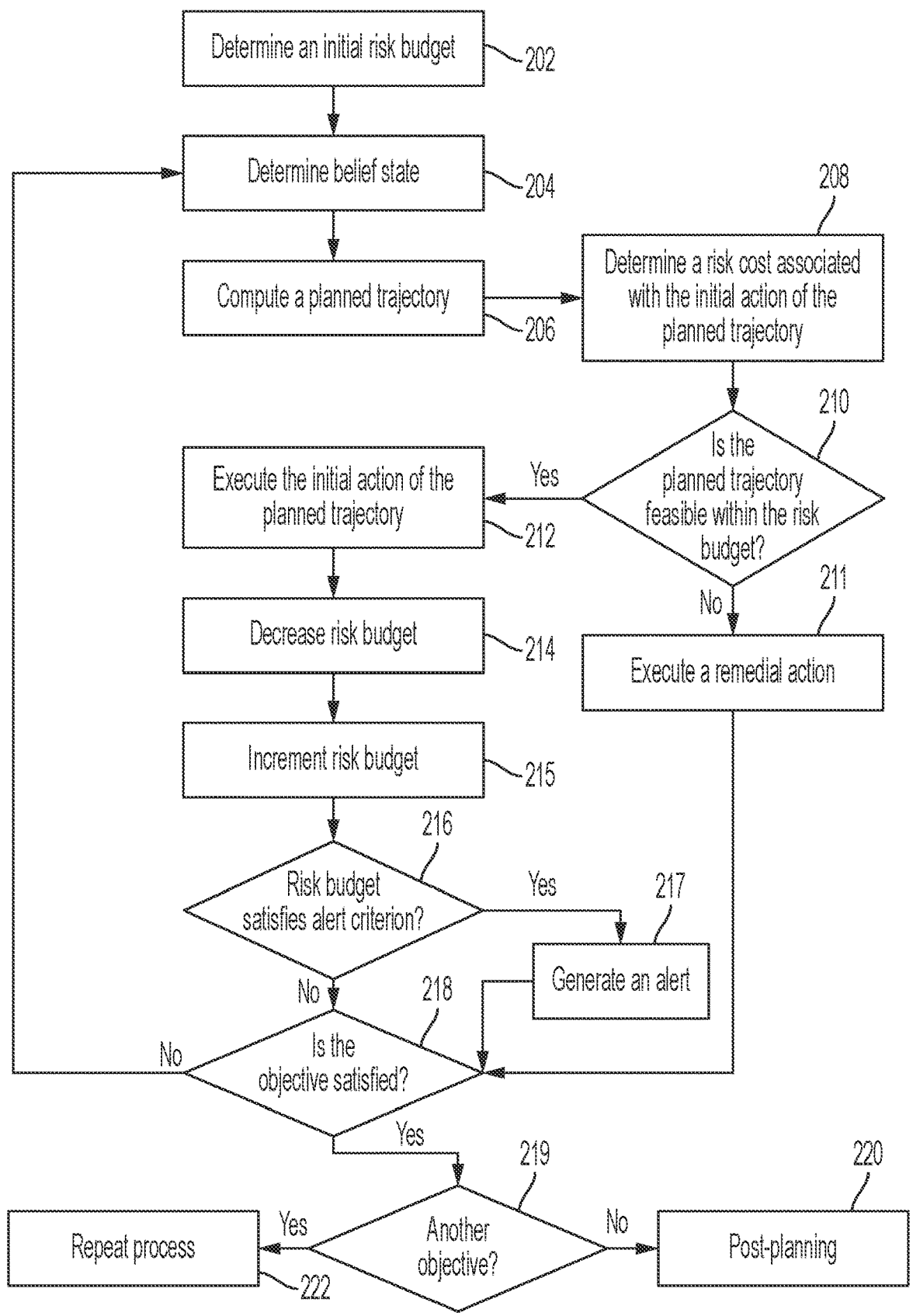
FIG. 2 is a flow diagram of an example of operations for safe non-conservative planning according to an embodiment.

FIG. 2 is a flow diagram of an example of operations for safe non-conservative planning according to an embodiment. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, operations described herein may be used for route planning and/or trajectory planning. In route planning, the "objective" may be a route plan; an initial risk budget may apply to the entire route plan; a planned trajectory may be a planned trajectory to a waypoint in the route; and executing an action may include defining the waypoint as part of the route. In trajectory planning, an "objective" may be autonomous travel to a waypoint; an initial risk budget may apply to a route segment that terminates at the waypoint; a planned trajectory may be a planned trajectory up to a predefined time horizon within the segment; and executing an action may include applying a control corresponding to the initial action in the planned trajectory.

As illustrated in FIG. 2, a system (e.g., the example system illustrated in FIG. 1) determines an initial risk budget (Operation 202). The initial risk budget may be predetermined, e.g., according to a predefined safety standard for the autonomous vehicle. Alternatively, the initial risk budget may be based on one or more dynamic factors. For example, the system may allocate more or less risk budget depending on how busy the environment is, the urgency of satisfying the objective, etc. The initial risk budget applies to an objective (e.g., an entire route plan or autonomous travel to a waypoint).

As input to planning, the system determines a belief state (Operation 204). The belief state is based, at least in part, on state data from sensors of the autonomous vehicle. The belief state may further be based on computed assumptions about the behavior of other agents (e.g., other vehicles and/or people whose behaviors are not entirely predictable) in the environment.

Based at least on the belief state and the initial risk budget, the system computes a planned trajectory (Operation 206). Computing the planned trajectory includes determining an approximately optimal (subject to constraints such as time and processing power) trajectory of the autonomous vehicle toward the objective.

The system determines a risk cost associated with the initial action of the planned trajectory (Operation 208). The risk cost may be determined in many different ways. In general, in an embodiment, the risk cost is based on a computed probability of collision (e.g., with a vehicle, obstacle, pedestrian, etc.) and/or other kind of safety violation or failure. The system may determine the risk cost, for example, based on a probabilistic prediction of the autonomous vehicle's motion and the motion of other agents in the environment. Some examples may use constraints other than, or in addition to, collision risk to determine risk costs.

The system determines whether the planned trajectory is feasible within the risk budget (Decision 210). That is, the system determines whether executing the planned trajectory can be performed without exceeding the initial risk budget. Determining whether the planned trajectory is feasible may include determining whether, after executing the initial action of the planned trajectory, the remaining risk budget would still allow for executing a remedial action if necessary.

If the planned trajectory is feasible within the risk budget, then the system executes the initial action of the planned trajectory (Operation 212) and decreases the risk budget accordingly (Operation 214). Specifically, the system decreases the risk budget by the amount of risk "consumed" by executing the action. The remaining risk budget, after this decrease, is the amount of risk budget still left toward the objective. In addition, the system may add an increment of additional risk budget to the remaining risk budget in each iteration (Operation 215). The increment of risk budget added may be relatively small, as compared to the total risk budget. Incrementing the remaining risk budget in this manner replenishes the risk budget slowly over time and may serve to bound interval risk in addition to episodic risk.

The system may determine whether the remaining risk budget satisfies an alert criterion (Operation 216). For example, an alert criterion may be a threshold value that, if the remaining risk budget is at or below the value, indicates an unsafe operating condition for the autonomous vehicle relative to predefined safety constraints. The system may compare the remaining risk budget with the threshold value. Alternatively or additionally, the alert criterion may be based on a feature of the trajectory or route planned for the autonomous vehicle. For example, the planned trajectory or route may include a feature (e.g., an obstacle or hazard), the handling of which is likely to consume a high amount of the remaining risk budget. If the remaining risk budget (along with such other factors as may be included) satisfies the alert criterion, the system may generate an alert (Operation 217). The system may present the alert, for example, in a user interface as described above. The alert may inform a human operator of the autonomous vehicle that the autonomous vehicle requires human intervention. For example, the alert may indicate that the autonomous vehicle needs to be taken out of operation before it exceeds its total allowable risk budget. As another example, the alert may indicate that the autonomous vehicle is approaching the end of its allowable risk budget.

In some examples, if a probabilistic model of other agents (e.g., vehicles, pedestrians, etc.) in the environment is performing poorly (i.e., failing to predict the agents' behavior with sufficient reliability), it may be possible for the system to exceed its risk bound. Alternatively or additionally, the system may determine that the autonomous vehicle is getting "stuck" with unacceptable frequency, another indication of prediction failure. In general, the system may determine that prediction failures exceed an acceptable threshold and, based on that determination, generate an alert.

The system determines whether the objective has been satisfied (Decision 218). If the objective is not yet satisfied (Decision 218), then the system determines a new belief state (Operation 204) and performs operations as described above, but now using the remaining risk budget. This process repeats iteratively until the objective is satisfied or the system is required to take a remedial action.

At any point in the iterative process, if the planned trajectory is not feasible within the risk budget (Decision 210), the system executes a remedial action (Operation 211).

In an embodiment, the system is designed to enforce a passive safety constraint as defined herein. According to passive safety principles, if the autonomous vehicle is already stopped, then executing the remedial action may simply involve refraining from taking any further action toward the objective. If the autonomous vehicle is in motion, then executing the remedial action may include executing a remedial action (e.g., an emergency stop) while also refraining from taking any further action toward the objective.

After executing the remedial action, the system may proceed to determine whether the objective has nonetheless been satisfied (Decision 218) and proceed from there as described above. That is, if the objective has not yet been satisfied, the system may continue to operate toward the objective. For example, if the autonomous vehicle has executed an emergency stop while traveling toward a waypoint, the autonomous vehicle may resume travel, still subject to the remaining risk budget.

When the objective has been satisfied (Decision 218), planning is complete. The system may determine whether planning for another objective is needed (Decision 219). If planning for another objective is needed, then the system may repeat the process described above for the next objective (Operation 222). For example, if the objective includes autonomous travel to a waypoint in a route, the next objective may include autonomous travel to the subsequent waypoint in the same route. In some cases, if a particular amount of risk budget was allocated to the initial objective and some of that risk budget remains, some or all of the remaining risk budget may be added to the risk budget allocated for the subsequent objective. The system may thus have more risk budget available for the subsequent objective than if no risk budget had remained after satisfying the initial objective. "Rolling over" the risk budget from one objective to the next may allow for greater efficiency based on higher available risk budget. For example, when planning toward the subsequent objective, the autonomous vehicle may be able to travel faster, take more left turns, etc.

If there are no more objectives for which planning is needed, the system may perform one or more post-planning operations (Operation 220). For example, a post-planning operation may include computing a safety evaluation metric for the vehicle, based on the objective and the amount of risk budget remaining when the objective is satisfied. The safety evaluation metric may be used to evaluate safety performance of the autonomous vehicle. If the safety evaluation metric is computed for multiple autonomous vehicles, the metrics may be compared with each other to provide objective information about the relative safety of the two vehicles. Alternatively or additionally, a safety evaluation metric may indicate that there is room in the risk budget to make the autonomous vehicle perform more efficiently, i.e., by planning even less conservatively (e.g., driving faster, taking more left turns, etc.) while still remaining within the allowable risk budget.

3. Detailed Examples

A. Introduction to Examples

The examples described below are provided for purposes of clarity and may not be applicable to one or more embodiments. Accordingly, components and/or operations described in these examples should not be construed as limiting the scope of one or more embodiments.

As described herein, planning safe, efficient robot motion (e.g., autonomous or semi-autonomous driving) in the presence of other agents (e.g., other vehicles, pedestrians, etc.) whose future motions are uncertain is a challenging technical problem. Even in structured environments where prior knowledge allows probabilistic prediction of agents' motions, planning optimal feedback policies—subject to constraints bounding the probability of safety violation—is computationally intractable. In practice, the optimal solution must be approximated, introducing a tradeoff between safety and performance: systems that satisfy a very high safety threshold may behave too conservatively, while systems that are non-conservative enough to meet practical efficiency requirements may not provide the desired safety guarantees, requiring close human supervision. For challenging, safety-critical applications like autonomous driving, one or more embodiments described herein compute safe, approximately optimal plans that guarantee hard constraints on safety, while achieving efficient, non-conservative performance that satisfies realistic computational constraints.

One or more embodiments include a criterion for probabilistically safe planning, referred to herein as episodic risk bounds (ERBs). ERBs provide a guarantee that the probability of safety violation for a planning algorithm is less than a given threshold, over the course of an entire episodic task within a dynamic, partially observable environment. This definition may satisfy, for example, the requirements of system designers who seek to provide statistical guarantees on the safety of robots performing sequences of tasks in dynamic environments (e.g., following a series of waypoints). As discussed herein, although open-loop approximations to the optimal feedback policy can satisfy an ERB, in practice their performance is too conservative for many applications. To improve performance, a feedback mechanism may be introduced using a receding horizon control (RHC) strategy. However, as discussed in further detail herein, prior approaches that attempt to constrain the probability of safety violations do not satisfy a strong ERB.

One or more embodiments include an RHC algorithm that satisfies an ERB and can be shown to achieve non-conservative performance in several autonomous driving environments. The example algorithm described below maintains a risk budget, initialized with the ERB given as input. Given the risk budget, the algorithm solves a constrained optimization problem that minimizes an estimate of the cost of an open-loop plan up to a finite horizon, subject to constraints on the risk incurred by the plan, and on an upper bound on the risk of a contingency plan that reaches a safe set. At each step, if the optimized plan is feasible, the first action of the plan is executed, and the risk incurred by this action is subtracted from the risk budget, which helps satisfy the ERB. The algorithm then replans with the new risk budget. If the optimized plan is infeasible, the contingency plan is executed immediately. In an embodiment, the contingency plan ensures the recursive feasibility of constraint satisfaction—the planner will never exceed the risk budget, because the contingency plan guarantees the safe set will always be reachable before this occurs. The contingency plan also reduces conservatism by providing a low-latency closed-loop policy, allowing the longer-horizon, open-loop planning process to plan less suboptimal behaviors.

The example algorithm described below is compatible with planners that accept probabilistic models of a robot and a dynamic environment, and that return a finite-horizon open-loop plan that satisfies a joint chance constraint. For simplicity, probabilistic dynamics and agent models may be assumed to be provided and validated independently of the example system described here. Although stronger definitions are possible, in this example a safe set is defined in terms of passive safety: the robot is assumed to be safe if it is not in collision with any obstacles, or if it is stopped. For concreteness, an example framework is described herein that includes a dynamics model, agent prediction algorithm, and planning algorithm. Several techniques for reducing conservativeness are compatible with this framework, allowing for improved performance while maintaining strong safety guarantees.

Examples described below apply the framework in several environments to support the theoretical arguments and demonstrate the performance and practicality of this approach. A simplified interactive autonomous driving example shows empirically that this approach satisfies the desired risk bound, but without exceeding it to a large degree due to over-conservativeness. This approach is compared with several alternative approaches from the literature, which are shown to be either over-conservative or fail to satisfy the safety bound. Another example described below introduces more complexity to the autonomous driving scenario and increases the safety threshold to a realistically high level. As described below, the example algorithm still exhibits good performance, while several alternative algorithms become overly conservative. The examples described below further include a real-world demonstration of the example algorithm running on an autonomous class 8 truck.

B. Example Problem Statement

1. System Model

In an embodiment, a stochastic discrete-time time-invariant system is defined as:

$$x_{i+1} = f(x_i, u_i, w_i) \quad (1)$$

$$y_i = h(x_i, v_i), \quad (2)$$

where $x_i \in \mathbb{X} \subseteq \mathbb{R}^{n_x}$ is the state at step i; $u_i \in \mathbb{U} \subseteq \mathbb{R}^{n_u}$ is the control taken at step i; and $w_i \in \mathbb{W} \subseteq \mathbb{R}^{n_w}$ represents the uncertainty in the system dynamics model and is sampled from a known probability distribution $P_{w_i}$. The system is partially observable, where $y_i \in \mathbb{Y} \subseteq \mathbb{R}^{n_y}$ is the observation at step i; and $v_i \in \mathbb{V} \subseteq \mathbb{R}^{n_v}$ is the measurement noise and is sampled from a known probability distribution $P_{v_i}$. The state transition function $f$ and the observation function $h$ are both deterministic functions.

For a finite horizon T, the step-wise cost function $l(x_i, u_i)$ for each step i and the final cost function $l_f(x_T)$ may be defined and given based on the objective of the planning problem. In a finite horizon partially observable Markov decision process (POMDP), the planning problem is to compute a non-stationary control policy $\Pi = \{\pi_0(\cdot), \ldots, \pi_{T-1}(\cdot)\}$, where $\pi_i(\cdot)$ maps the belief state at step i, $b_i \in \mathbb{B}$ to a control $u_i$ that minimizes the expected accumulated cost. The belief state is a sufficient statistic for the initial belief $b_0$ and the history of controls $u_{0:i-1}$ and observations $y_{0:i}$. A belief state transition function $b_{i+1}(x_{i+1}) = f_b(b_i, \pi_i(b_i), y_{i+1})$ updates the belief after control $\pi_i(b_i)$ and observation $y_{i+1}$ by applying Bayesian filtering, such that:

$$b_{i+1}(x_{i+1}) = \eta p(y_{i+1} | x_{i+1}) \sum_{x_i \in \mathbb{X}} p(x_{i+1} | x_i, u_i) b_i(x_i).$$

For safety-critical applications, the states may be constrained to be outside some collision zone $\mathbb{X}^{coll} \subseteq \mathbb{X}$. These examples exclude states that are passively safe from $\mathbb{X}^{coll}$: if the ego vehicle is static in state x, then $x \notin \mathbb{X}^{coll}$ and it is passively safe. Since the uncertainty introduced to the system can be unbounded, it cannot be guaranteed that the state constraint is always satisfied. Instead, a joint chance constraint may be applied in the system:

$$Pr\left(\bigcup_{i=0}^{T}(x_i \in \mathbb{X}^{coll})\right) \leq \alpha, \quad (4)$$

where the upper threshold of the collision probability over the T steps is denoted as $\alpha$.

The chance-constrained POMDP (CC-POMDP) optimization problem may be formulated as:

$$\Pi^* \operatorname{argmin}_{\Pi} \mathbb{E}_{y_{0:T-1}}\left[c_f(b_T) + \sum_{i=0}^{T-1} c(b_i, \pi_i(b_i))\right] \quad (5a)$$

such that:

$$b_{i+1} = f_b(b_i, \pi_i(b_i), y_{i+1}) \quad (5b)$$

$$Pr\left(\bigcup_{i=0}^{T}(x_i \in \mathbb{X}^{coll})\right) \leq \beta, \quad (5c)$$

where $c(b_i, \pi_i)$ and $c_f(b_T)$ are the step-wise cost function and the final cost function in terms of the belief state:

$$c(b_i, \pi_i, (b_i)) = \sum_{x_i \in \mathbb{X}} l(x_i, \pi_i(b_i)) b_i(x_i) \quad (6)$$

$$c(b_T) + \sum_{x_T \in \mathbb{X}} l(x_T) b_T(x_T). \quad (7)$$

In an embodiment, the joint chance constraint (5c) enables non-conservative behavior by allowing non-uniform allocation of risk across steps.

2. Receding Horizon Approximation

The optimization in (5) is NP-hard. In an embodiment, efficient approximations are included for real-time applications. One approach is to use an RHC strategy, recursively solving (5) over a much shorter horizon N than the original horizon T, executing the first control in the optimized control sequence, and updating the belief. Although in general the RHC policy is suboptimal, one or more embodiments preserve the original chance constraint (4) over the interval [0, T]. One might expect that by setting the joint chance constraint to allocate $\alpha/T$ for every step in the RHC planning horizon N that one can satisfy the original chance constraint of $\alpha$ in (4). However, as discussed in further detail below, this bound does not hold.

3. Open-Loop Approximation

Even with a short planning horizon N, solving the CC-POMDP may be too expensive to perform online (i.e., in a "live" environment, in real time). One approach for improving computational efficiency, used by model predictive control techniques, is to transform the CC-POMDP to an open-loop system. The unobservable Markov decision process (UMDP) transformation makes the simple assumption that the POMDP is unobservable, with the future belief state $b^{OL}$ fully determined by the control sequence using the open-loop belief state transition function $b_{i+1}^{OL}(x_{i+1}) = f_b^{OL}(b_i^{OL}, u_i)$:

$$b_{i+1}^{OL}(x_{i+1}) = \sum_{x_i \in \mathbb{X}} p(x_{i+1} | x_i, u_i) b_i^{OL}(x_i). \tag{8}$$

For CC-POMDPs, it can be shown that this approximation is safety-preserving: a feasible solution to the CC-UMDP is a feasible—but suboptimal—solution to the original CC-POMDP. Because UMDP is fully open-loop, it is a very conservative approximation; the predicted open-loop belief states can have high covariance (e.g., imagine navigating a dynamic environment with closed eyes). A "closed-loop covariance" may be introduced to account for the future observations; in Partially Closed-Loop Receding Horizon Control (PCL-RHC), the future open-loop belief state bpi, is replaced with the future partially closed-loop belief state $b_i^{CL}$, which assumes that the most likely observation is made after the current step k, such that:

$$b_{i+1}^{PCL}(x_{i+1}) = p(x_{i+1} | b_0, u_{0:i}, y_{1:k}, y_{k+1,i}^{ML}), \tag{9}$$

where $y^{ML}$ is the maximum-likelihood predicted observation. (In this example, a definition of $b_i^{CL}$ does not condition on $y_i^{ML}$.) Examples discussed below include an algorithm that can use (9) to plan non-conservatively, while preserving safety guarantees. In addition, the following discussion demonstrates that a baseline that uses (8) produces more conservative behavior.

C. Risk-Budget RHC

1. Introduction to Risk-Budget RHC

A space of parametric bounds on the total risk incurred by chance-constrained RHC (CC-RHC) may be defined over an interval or episode. A proof may then be sketched by counterexample that the risk incurred over the interval [0, T] by the RHC method described above is not bounded by α when the joint chance-constrained optimization allocates α/T risk per step. The following discussion introduces an example of a safe and non-conservative planning algorithm, Risk-Budget RHC (RB-RHC), and proves a bound on the risk incurred as a function of the joint chance constraint used at each replanning step.

2. Episodic Risk Bounds

In an embodiment, episodic risk bounds constrain the risk incurred by a planner over arbitrary time periods or tasks. For example, system designers may wish to bound the expected number of safety violations per year (risk over an interval), or to bound the expected chance of safety violation while executing a particular task (risk over an episode). One or more embodiments use a definition that encompasses both interval and episodic risk bounds.

Definition 1: In an embodiment, an episodic risk bound is an upper bound on the risk incurred during the interval [0, T], such that:

$$Pr\left(\bigcup_{i=0}^{T} (x_i \in \mathbb{X}^{coll})\right) \leq \rho_0 + \delta T, \tag{10}$$

where $\rho_0$ and $\delta$ are parameters in $\mathbb{R}^+ \cup \{0\}$.

The parameter $\delta$ is the amount of risk allocated to the risk budget at each timestep, capturing the concept that risk scales linearly with the length of the time interval (i.e., at a constant rate). The parameter $\rho_0$ captures a fixed amount of risk allocated over the course of an episode.

3. Racetrack Counterexample

The following discussion includes a proof that RHC with a joint chance constraint of β does not satisfy an episodic risk bound with $\rho_0=0, \delta=\beta/N$, using a simple counterexample. The concept behind the counterexample is that at every iteration, joint chance-constrained RHC can allocate the maximum risk allowed by the chance constraint to the first step. This can lead the algorithm to incur risk that far exceeds the desired episodic risk bound.

Figure 3:
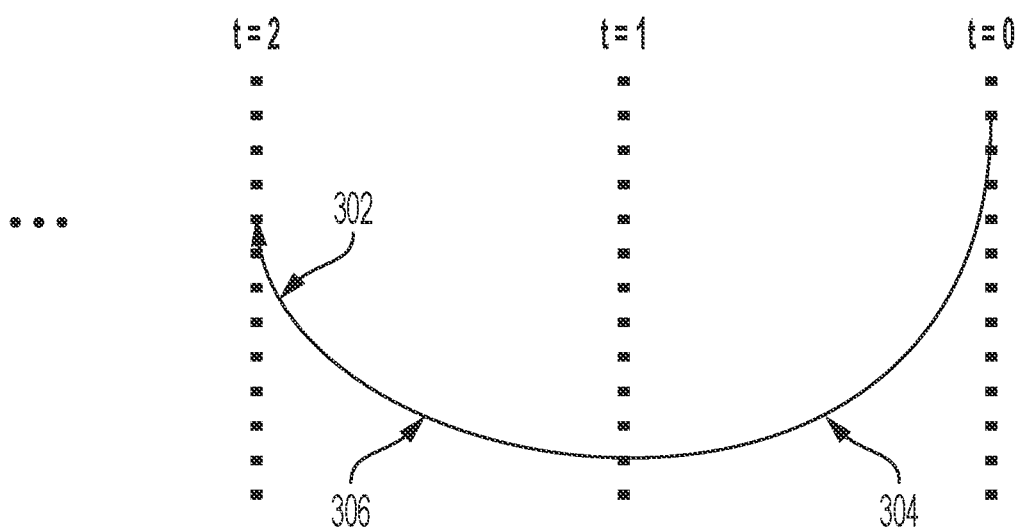
FIG. 3 illustrates a racetrack counterexample according to an embodiment.

In this example, illustrated in FIG. 3, a racetrack has two consecutive sharp curves; the curved arrow 302 represents the path of a vehicle (not shown) around two curves 304, 306 of the racetrack. For the first sharp curve, there is 10% chance of crashing if driven at 100 mph, and a 0% chance of crashing if driven at 70 mph; for the second curve, there is 10% chance of crashing if driven at 90 mph, and a 0% chance of crashing if driven at 70 mph. For simplicity, in this example, no other speeds can be chosen. Solving this problem may use RHC with N=2, where $u_1$ and $u_2$ are the speeds taken at the first and second curves, and $y_1$ and $y_2$ are their respective outcomes, which can either be "crash" or "safe." This example seeks to plan a policy over $u_1$ and $u_2$ that drives as fast as possible while bounding the probability of crashing during the interval [0,2] below α=0.1.

In order to realize this bound, this example sets the joint chance constraint β=αN/T=0.1·2/2=0.1, allocating α/T risk for each step of the planning horizon. At t=0, the optimal policy is: $u^*_1=100, u^*_2=70$, which satisfies the β=0.1 joint chance constraint by allocating all the risk to drive fast in the first curve. If the car luckily does not crash in the first curve, RHC can replan at t=1 using β=0.1 again and get $u^*_2=90$. The probability of all three outcome combinations with this RHC policy is:

$Pr(y_1 = \text{"crash"}) = 0.1$ $Pr(y_1 = \text{"safe"}, y_2 = \text{"crash"}) = 0.9 \cdot 0.1 = 0.09$ $Pr(y_1 = \text{"safe"}, y_2 = \text{"safe"}) = 0.9 \cdot 0.9 = 0.81$.

The overall probability of crashing for this RHC policy is 0.1+0.09=0.19. Therefore, RHC with a joint chance constraint of β which allocates α/T risk for each step of the planning horizon does not satisfy the desired chance constraint α=0.1, or the episodic risk bound with $\rho_0=0, \delta=\beta/N=\alpha/T$ on the interval [0, T=2], which is δT=α=0.1.

4. Example Algorithm

In an embodiment, using RB-RHC allows for replanning with regard to the remaining risk budget instead of the total risk budget. This prevents the algorithm from exceeding the total risk budget and violating the joint chance constraint (4).

In addition, if the finite-horizon planning problem at a certain step has no solution, the control to take is unclear in RHC. (The open-loop planning problem can have no solution when the ego vehicle starts in a dangerous belief state where no legal control sequence can lead to a belief state sequence that satisfies the joint chance constraint.) In RB-RHC, the vehicle is configured to execute the contingency plan such as emergency stop in this case, which is similar to what a human may do when they can't plan. Mathematically, emergency stop may be defined as repeating the maximum deceleration control $u_{stop}$ for at most $t_{stop}$ steps, which is assumed to enter the passively safe (stopped) belief state set $\mathbb{B}^{stop} \subseteq \mathbb{B}$ from any belief state. (Here, $u_{stop}$ and $t_{stop}$ are constants dependent on the maximum deceleration and maximum speed of the vehicle). Similar to the passively safe state defined herein, the passively safe belief states are belief states with deterministic zero velocity. Since the passively safe states are defined to not belong to $\mathbb{X}^{coll}$, the collision chance in the passively safe belief states is zero, $$\forall b \in B^{stop}: \sum_{x \in \mathbb{X}^{coll}} b(x) = 0 \tag{11}$$

To fully characterize RB-RHC, the following terms may be defined:

$f_b^{stop}(b, \tau)$ may be defined as a function that returns the belief state after taking $u_{stop}$ for r steps from a belief state b without any observation received. It satisfies $f_b^{stop}(b, \tau) = f_b^{OL}(f_b^{stop}(b, \tau-1), u_{stop})$.

$g_b(b)$ may be defined as the probability of collision of a belief state b: $g_b(b) = \sum_{x \in \mathbb{X}^{coll}} b(x)$.

$g_b^{stop}(b)$ may be defined as the probability of collision during the emergency stop starting from a belief state b: $g_b^{stop}(b) = \sum_{\tau=1}^{t_{stop}} g_b(f_b^{stop}(b, \tau))$..

RB-RHC may be formulated based on the discussion above. Similar to joint chance-constrained RHC (JCC-RHC), RB-RHC has an inner open-loop planning problem and an outer re-planning loop. The open-loop planning problem that is solved by RB-RHC at step k is, $$u_{k:k+N-1}^* = \arg\min_{u_{k:k+N-1}} \left( c_f(b_{K+N}) + \sum_{i=k}^{k+N-1} c(b_i, u_i) \right) \tag{12a}$$

such that:

$$b_{k+1} = f_b^{OL}(b_k, u_k) \tag{12b}$$

$$b_{i+1} = \tilde{f_b}(b_i, u_i), \forall i \in \{k+1, \ldots, k+N-1\} \tag{12b}$$

$$\sum_{i=k+1}^{k+N} [g_b(b_i) + g_b^{stop}(b_i)] \leq \rho_k. \tag{12c}$$

where b is the partially closed-loop belief state defined in (9), which should have covariance less than or equal to $b^{OL}$, and $\rho_k$ is the rolling risk budget at step k. The belief update notation $\tilde{f_b}$ in (12b) denotes that this algorithm can use approximate belief updating heuristics after step k+1 (such as partially closed-loop belief updating or sampling) to reduce the conservatism of purely open-loop belief updating, without sacrificing the safety guarantees that open-loop updating provides.

An RB-RHC algorithm according to an embodiment is detailed in Algorithm 1, illustrated in FIG. 4. From lines 3-4, it recursively solves the open-loop planning problem and executes the first control. If (12) does not have a solution, the ego vehicle must already be in a dangerous belief state. Therefore, from lines 7-10, this approach chooses to take the most conservative control $u_{stop}$ (emergency stop) or NO-OP (remain stopped) depending on whether the ego vehicle is moving or not. After the action is executed, the rolling risk budget is increased by the average risk taken per step δ in line 12.

In an embodiment, RB-RHC includes the following features as shown in line 5 of Algorithm 1: whenever a new control $u^*_k \notin \{u_{stop}, \text{NO-OP}\}$ will be executed, the rolling risk budget ρ will be decreased. The risk budget is considered a limited resource. Line 5 keeps track of the rolling risk budget by subtracting out the risk usage caused by $u^*_k$: $g_b(f_b^{OL}(b, u^*_k)) + g_b^{stop}(f_b^{OL}(b, u^*_k))$. The first term $g_b(f_b^{OL}(b, u^*_k))$ is the risk of collision at step k+1 after executing $u^*_k$. The second term $g_b^{stop}(f_b^{OL}(b, u^*_k))$ bounded the risk of collision during emergency stop if (12) does not have a solution at step k+1 after $u^*_k$ is executed.

In an embodiment, the RB-RHC also plans the risk budget usage ahead. There is a trade-off between taking risk now or taking risk later. An aggressive control $u^*_k$ might collect less cost in (12a), but it might as well use up most of the rolling risk budget. At step k, to save enough risk budget for future steps, the risk usage may be heuristically modeled at step i to be $g_b(b_i) + g_b^{stop}(b_i)$ in (12c). Therefore, any optimal control sequence $u^*_{k:N-1}$ that satisfies (12c) will leave $\sum_{i=k+2}^{N} [g_b(b_i) + g_b^{stop}(b_i)]$ risk budget for future N−1 steps after $u^*_k$ is executed.

5. Theoretical Analysis of Safety Guarantee

A theoretical analysis according to an embodiment starts by assuming the initial belief state $b_0$ satisfies the condition that (12) has a solution at k=0 to exclude unrecoverably dangerous $b_0$. The following discussion proves RB-RHC (Algorithm 1) to satisfy (4) with $\alpha = \rho_0 + \delta T$ by mathematical induction.

Lemma 1. Given the inductive hypothesis, if (12) has a solution $u^*_k$ with $b_k = b$, $\rho_k = \rho$, then the probability of collision in the remaining steps is bounded by $\rho + \delta(T-k)$.

Inductive hypothesis: For all possible future observations after $u^*_k$ is executed, the first step l>k when (12) is solvable again with the rolling risk budget $\rho_l = \rho' + \delta(l-k)$, where $\rho' \rho - g_b(f_b^{OL}(b, u^*_k)) - g_b^{stop}(f_b^{OL}(b, u^*_k))$, the probability of collision in the remaining steps is bounded by $\rho_l + \delta(T-l) = \rho' + \delta(T-k)$, which is not a function of l.

At step k, the probability of collision in the remaining steps is bounded by the sum of probability of collision caused by three conditions, 1. The probability of collision at step k+1:

$$Pr(x_{k+1} \in \mathbb{X}^{coll}) = g_b(f_b^{OL}(b, u^*_k)).$$

2. the probability of collision from step k+2 to T and (12) is solvable with $b_{k+1}$ and $\rho_{l=k+1}$ at step k+1:

$$Pr\left(b_{k+1} \in \mathbb{B}_{k+1}^{solv}, \bigcup_{i=k+2}^{T} (x_i \in \mathbb{X}^{coll})\right) \leq (\rho' + \delta(T-k)) \cdot Pr(b_{k+1} \in \mathbb{B}_{k+1}^{solv})$$

where $\mathbb{B}_{k+1}^{solv} \subseteq \mathbb{B}$ denotes the set of $b_{k+1}$ such that (12) is solvable with input belief state $b_{k+1}$ and rolling risk budget $\rho_{l=k+1}$. The inductive hypothesis is used here so that $\rho'+\delta(T-k)$ bounds the probability of collision from step $k+2$ to T if (12) is solvable at step $k+1$.

3. the probability of collision from step $k+2$ to T and (12) is unsolvable with $b_{k+1}$ and $\rho_{l=k+1}$ at step $k+1$:

When $b_{k+1} \notin \mathbb{B}_{k+1}^{solv}$, RB-RHC will execute a sequence of $u_{stop}$ followed by a sequence of NO-OP until (12) is solvable again at step l with the rolling risk budget $\rho_l$. The probability of collision for this condition therefore includes, the probability of collision during emergency stop: $g_b^{stop}$ ($f_b^{OL}(b, u^*_k)$).

the probability of collision in the remaining steps after (12) is solvable again: $(\rho'+\delta(T-k)) \cdot Pr(b_{k+1} \notin \mathbb{B}_{k+1}^{solv})$.

Therefore:

$Pr(b_{k+1} \notin \mathbb{B}_{k+1}^{solv}, U_{i=k+2}^T(x_i \in \mathbb{X}^{coll})) \leq (\rho'+\delta(T-k)) \cdot Pr(b_{k+1} \notin \mathbb{B}_{k+1}^{solv}) + g_b^{stop}(f_b^{OL}(b,u^*_k))$ One can sum the probability of collision caused by the three conditions and prove that the probability of collision from step $k+1$ to T is bounded by $\rho+\delta(T-k)$, $$Pr\left(\bigcup_{i=k+1}^{T}(x_i \in \mathbb{X}^{coll})\right) \leq g_b(f_b^{OL}(b, u^*_k)) + (\rho' + \delta(T-k)) \cdot Pr(b_{k+1} \in \mathbb{B}_{k+1}^{solv}) +$$

$$(\rho' + \delta(T-k)) \cdot Pr(b_{k+1} \notin \mathbb{B}_{k+1}^{solv}) + g_b^{stop}(f_b^{OL}(b, u^*_k)) =$$

$$g_b(f_b^{OL}(b, u^*_k)) + (\rho' + \delta(T-k)) + g_b^{stop}(f_b^{OL}(b, u^*_k)) = (\rho + \delta(T-k))$$

Lemma 2. If (12) has a solution $u^*_{T-1}$ with $b_k=b$, $\rho_k=\rho$ at the second final step $k=T-1$, then the probability of collision in step T is bounded by $\rho$.

The probability of collision in step T is, $Pr(x_T \in \mathbb{X}^{coll}) = g_b(f_b^{OL}(b,u^*_{T-1})) = g_b(b_T)$.

Since $u^*_{T-1}$ is a solution of (12), it satisfies (12c), $\rho \geq g_b(b_T) + g_b^{stop}(b_T) \geq g_b(b_T) = Pr(x_T \in \mathbb{X}^{coll})$.

Theorem 1. Given the initial risk budget $\rho_0$ and the non-dangerous initial belief state $b_0$ where (12) has a solution at $k=0$ with $b_0$, the policy planned by RB-RHC is guaranteed to satisfy (4) with $\alpha=\rho_0+\delta T$.

Lemma 2 proves the base step and Lemma 1 proves the induction step. Therefore, by mathematical induction, the theorem is proven.

D. Simulation and Real-World Results

1. Introduction

The following discussion demonstrates the safety and non-conservativeness of the example RB-RHC algorithm in two uncertain, dynamic simulation examples. In these examples, all dynamic obstacles are vehicles. In Example 1, RB-RHC is shown to be practically safe in a simple environment while partially closed loop RHC (PCL-RHC) violates the overall chance constraint. In Example 2, RB-RHC is shown to be less conservative than JCC-RHC in a complex environment. RB-RHC is also applied to an autonomous yard truck with a 2.5 m by 15 m trailer, to show the applicability of RB-RHC in safety critical environments. In all of these examples, a kinematically feasible reference path is assumed to be given. The reference path is collision-free to all static obstacles. (Separating the planning problem into path planning and speed planning reduces the dimension of the planning problem. For navigating in a tight yard, such separation won't sacrifice much efficiency.) These examples aim to plan a speed profile on the reference path to reach the goal with least cost, while satisfying some overall chance constraint with regards to dynamic obstacles. The behavior of the dynamic obstacles is assumed to be independent from the ego vehicle's control.

2. RB-RHC Implementation

In an embodiment, in an environment with n dynamic obstacles, states $x=[s, d_1, \ldots, d_n]$ include $n+1$ independent parts: the ego vehicle state $s \in \mathbb{S} \subseteq \mathbb{R}^{n_s}$ and all n dynamic obstacles' states $d_j \in \mathbb{D}_j \subseteq \mathbb{R}^{n_{d_j}}$, where $j=1, \ldots, n$. The ego vehicle belief state may be modeled as Gaussian distribution $b(s) = \mathcal{N}(\mu_s, \Sigma_s)$ and its belief state transition model may be governed by the vehicle kinematic model and the vehicle tracking performance. The jth dynamic obstacle belief state may be modeled as a mixture of Gaussian distribution $b(d_j) = \Sigma_{k=1}^{M} \phi_k \mathcal{N}(\mu_{d_{jk}}, \Sigma_{d_{jk}})$, where each mixture represents a motion pattern. For each dynamic obstacle, one may use an RR-GP prediction model as its belief state transition model. RR-GP provides a mixture of Gaussian predictions that satisfy dynamic and environmental constraints. At step k, the RR-GP model for the jth dynamic obstacle provides $b_i^{PCL}(d_j)$ and $b_i^{OL}(d_j)$ for $i=k+1, \ldots, N$.

Given the belief state b, the collision chance $g_b(b)$ is the sum of collision chance between the ego vehicle and each dynamic obstacle. The collision chance of two disk shaped objects can be calculated in closed form, $0.5+0.5 \cdot \mathrm{erf}(-d / \sqrt{2(\mu_{x_1}-\mu_{x_2})^T(\Sigma_1+\Sigma_2)(\mu_{x_1}-\mu_{x_2})})$ where the first object has radius $r_1$ and centered at $x_1 \sim N(\mu_{x_1}, \Sigma_{x_1})$; the second object has radius $r_2$ and centered at $x_2 \sim N(\mu_{x_2}, \Sigma_{x_2})$; and the mean closest distance $d=\|\mu_{x_1}, \mu_{x_2}\| - r_1 - r_2$. For an object not in disk shape, one may cover it with disks and sums the collision chance among the two set of disks to get the collision chance between the two objects.

There are multiple ways to model and solve (12) in RB-RHC. One approach solves it by graph search in discretized belief space. In fact, given the RR-GP prediction models of dynamic obstacles, the belief state $b_i$ can be fully determined by the spatial-temporal state of the ego vehicle $\{i, s_i\}$ without the control history $u_{k:i}$. The belief state of dynamic obstacles is fully determined by the RR-GP model and is irrelevant to the control history. One may set the covariance of the ego vehicle state to the worst tracking performance of the control system on the ego vehicle; therefore, it is also independent to the control history. The state of the ego vehicle s on the reference path can further be determined by the distance $\delta$ and velocity v of the ego vehicle on the reference path. By discretizing the three dimensional space $\{i, \delta, v\}$, one may obtain the node set $\mathcal{V}$ of the directed graph $\mathcal{G} = \{\mathcal{V}, \varepsilon\}$. Note that there is a one-on-one mapping between $\{i, \delta, v\}$ and $b_i$ so each node also represents a belief state $b_i$. An edge $\{\{i_1, \delta_1, v_1\}, \{i_2, \delta_2, v_2\}\}$ is in the edge set £ if and only if $i_2=i_1+1$ and there exists a legal acceleration profile (control u) to bring the vehicle from $\{\delta_1, v_1\}$ to $\{\delta_2, v_2\}$ in one step. A cost is also assigned to each edge using $c_f(b_N)$ or $c(b_i, u_i)$.

Without the chance constraint (12c), (12) can be solved by relaxing the edges in the graph $\mathcal{G}$ in the inverse temporal order. (12c) is a path constraint for the graph search problem. One may convert the constrained graph search to an unconstrained one by introducing the Lagrange multiplier $\lambda$. Instead of using $c(b_i, u_i)$ as intermediate edge costs, one may use $c(b_i, u_i) + \lambda [g_b(b_i) \ g_b^{stop}(b_i)]$ for the augmented unconstrained graph search. When $\lambda=\infty$, a path with least risk is found without considering optimality. When $\lambda=0$, the chance constraint is ignored. Starting with a large $\lambda$ interval $[\lambda^L, \lambda^U]$, one may iteratively solve the augmented unconstrained graph search with the $$\lambda = \frac{\lambda^L + \lambda^U}{2}.$$

If the optimal path satisfies (12c), the interval $[\lambda^L, \lambda^U]$ for the next iteration will be the lower half of it; otherwise, the upper half is used. This bisection search method will converge to the locally optimal A and the locally optimal solution to (12).

3. Example 1: Simple Intersection Scenario

Figure 5:
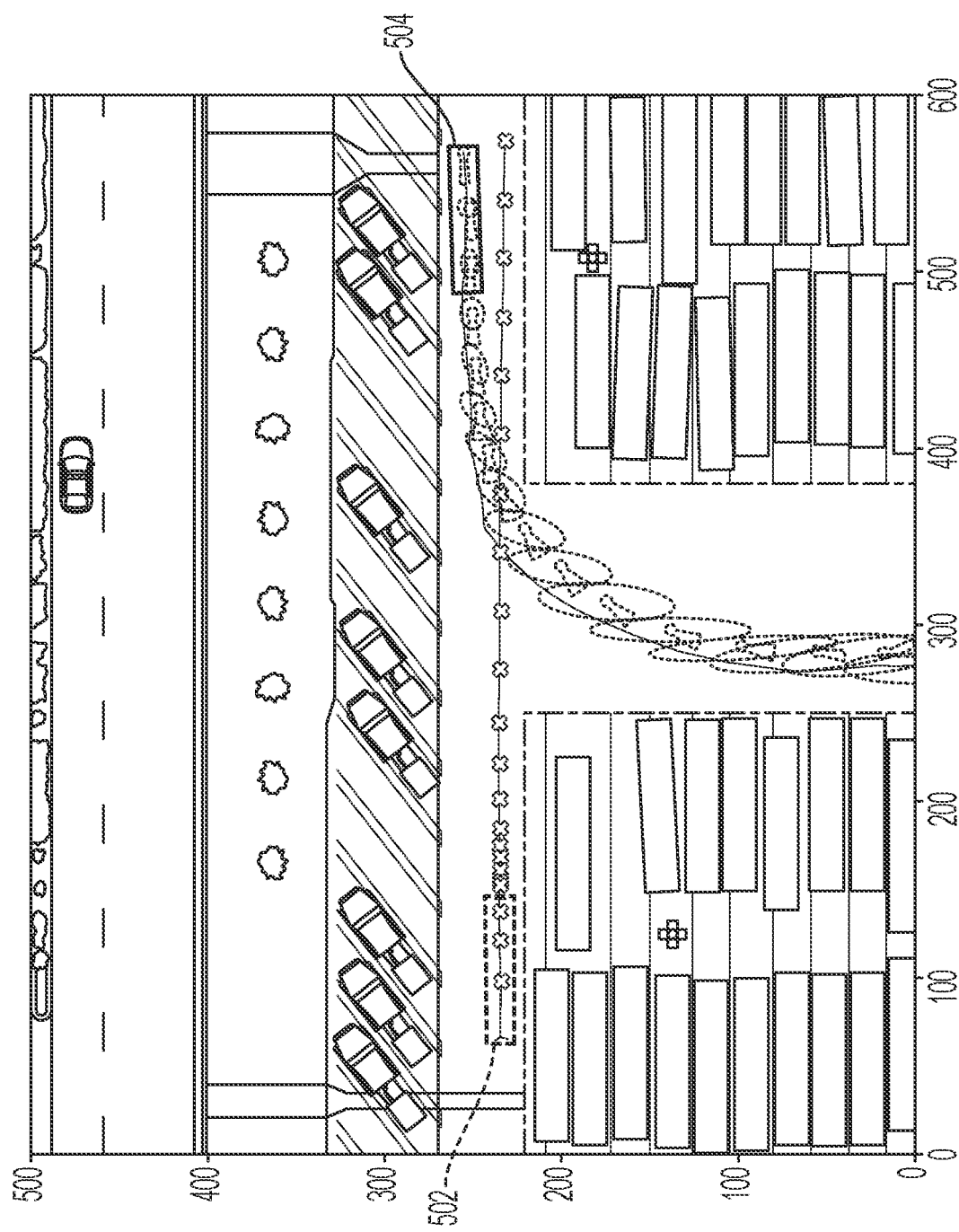
FIG. 5 illustrates an example according to an embodiment.

This example, illustrated in FIG. 5, shows that RB-RHC can practically satisfy the overall chance constraint while PCL-RHC failed to do so. The ego vehicle 502 meets a left turning dynamic obstacle 504 in a T-junction. Both vehicles are in bus-like rectangular shape: 12.6 meters in length, 2.4 meters in width. One may assume the dynamic obstacle 504 operates with a single motion pattern and the state is fully observable. The ego vehicle kinematic model is assumed to be the deterministic bicycle model. However, the ego vehicle 502 is still uncertain about the future states of the dynamic obstacle.

The states of both vehicles are four dimensional: [x, y, θ, v], which denotes the x, y coordinate, the heading angle, and the velocity. The control is two dimensional: [a, ψ], which denotes the acceleration and the steering angle. The velocity, acceleration, and steering angle of the ego vehicle are constrained by $|v| \leq 5$ m/s, $|a| \leq 5$ m/s$^2$, $|\psi| \leq 0.65$ rad. The maximum planning horizon N=25 sec and the overall collision chance upper threshold $\alpha_0=0.01$. Note that $\alpha_0=0.01$ is multiple orders of magnitude higher than what would be chosen in practice. Here, choosing a high value of $\alpha_0$ allows one to empirically measure collision probability in a practical number of trials. The planning time step is 1 sec and re-planning frequency is 1 Hz. Before reaching the goal, the cost function $l(x_i, u_i)$ is $1.0+0.5 \cdot a_i^2$. This example drives the dynamic obstacle 504 ten times with the same left turning motion pattern and uses the data to formulate the RR-GP prediction model for the dynamic obstacle 504. A total of 1000 different initial conditions were tested on JCC finite horizon (JCC-FH), JCC-RHC, PCL-RHC, and RB-RHC. Each initial condition includes the initial state of the ego vehicle 502 and the future states of the dynamic obstacle that is pre-sampled from the same distribution as the RR-GP prediction model.

Table 1 below presents the averaged results over the 1000 initial conditions for each algorithm.

TABLE 1

SIMULATION RESULTS, EXAMPLE 1, $\alpha_0 = 0.01$

| Algorithm | Collision Rate | Navigation Cost |
|---|---|---|
| JFF-FH | 0.007 ± 0.003 | 24.678 ± 0.037 |
| JCC-RHC | 0.001 ± 0.001 | 24.177 ± 0.048 |
| PCL-RHC | 0.015 ± 0.004 | 23.866 ± 0.086 |
| RB-RHC | 0.010 ± 0.003 | 24.021 ± 0.081 |

Figure 6:
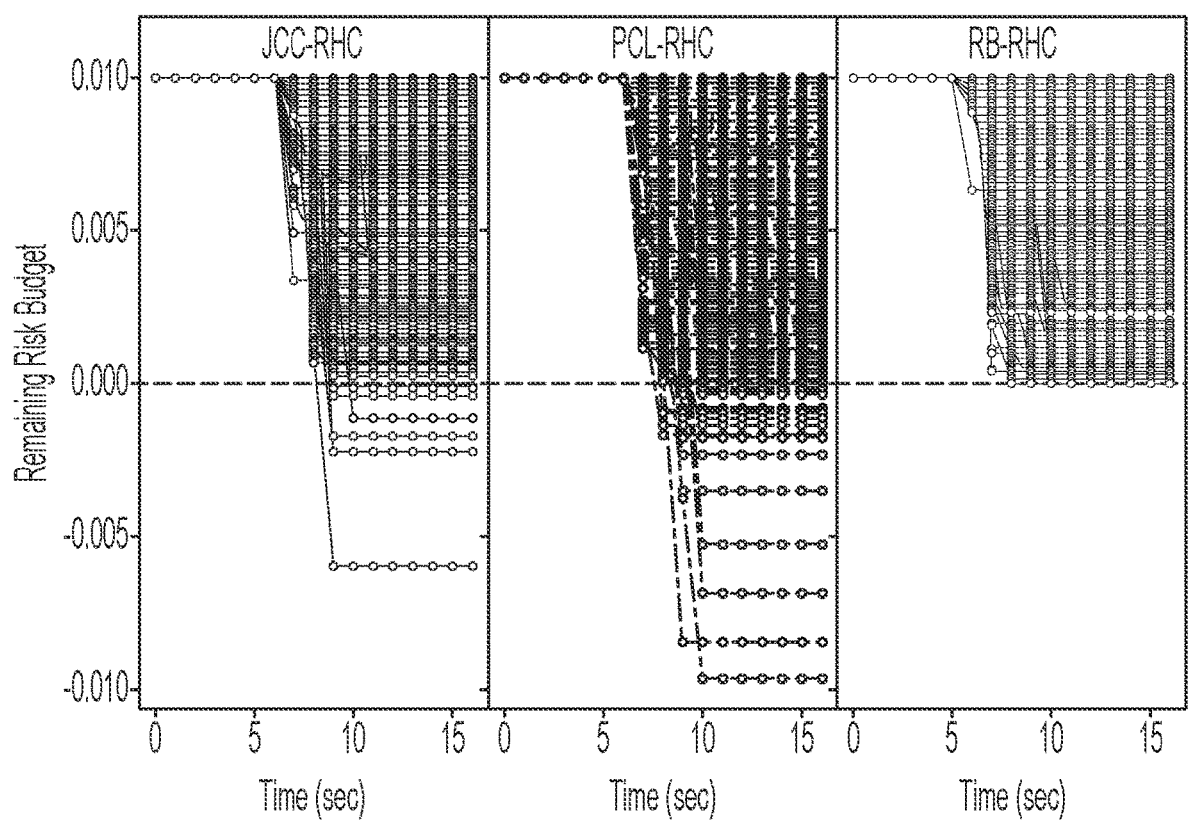
FIG. 6 illustrates results of the example of FIG. 5 according to an embodiment.

In this example, only PCL-RHC violates the overall chance constraint and RB-RHC is shown to practically satisfy the chance constraint. The fact that the failure rate in RB-RHC exactly matches $\alpha_0$ suggests that RB-RHC takes the most risk that it is allowed to in order to collect least cost. The failure rate in JCC-RHC is considerably less than $\alpha_0$ because JCC-RHC is often practically willing to take less risk due to its conservative nature. Note that in theory, JCC-RHC can violate the overall chance constraint as shown in the Racing Counterexample discussed above, when multiple risky events are introduced but this example includes only one risky event. Additionally, FIG. 6 shows the remaining risk budget throughout time with all trials. Both JCC-RHC and PCL-RHC overdraft the overall risk budget $\alpha_0$ but not the RB-RHC.

4. Example 2: Complex Yard Scenario

Figure 7:
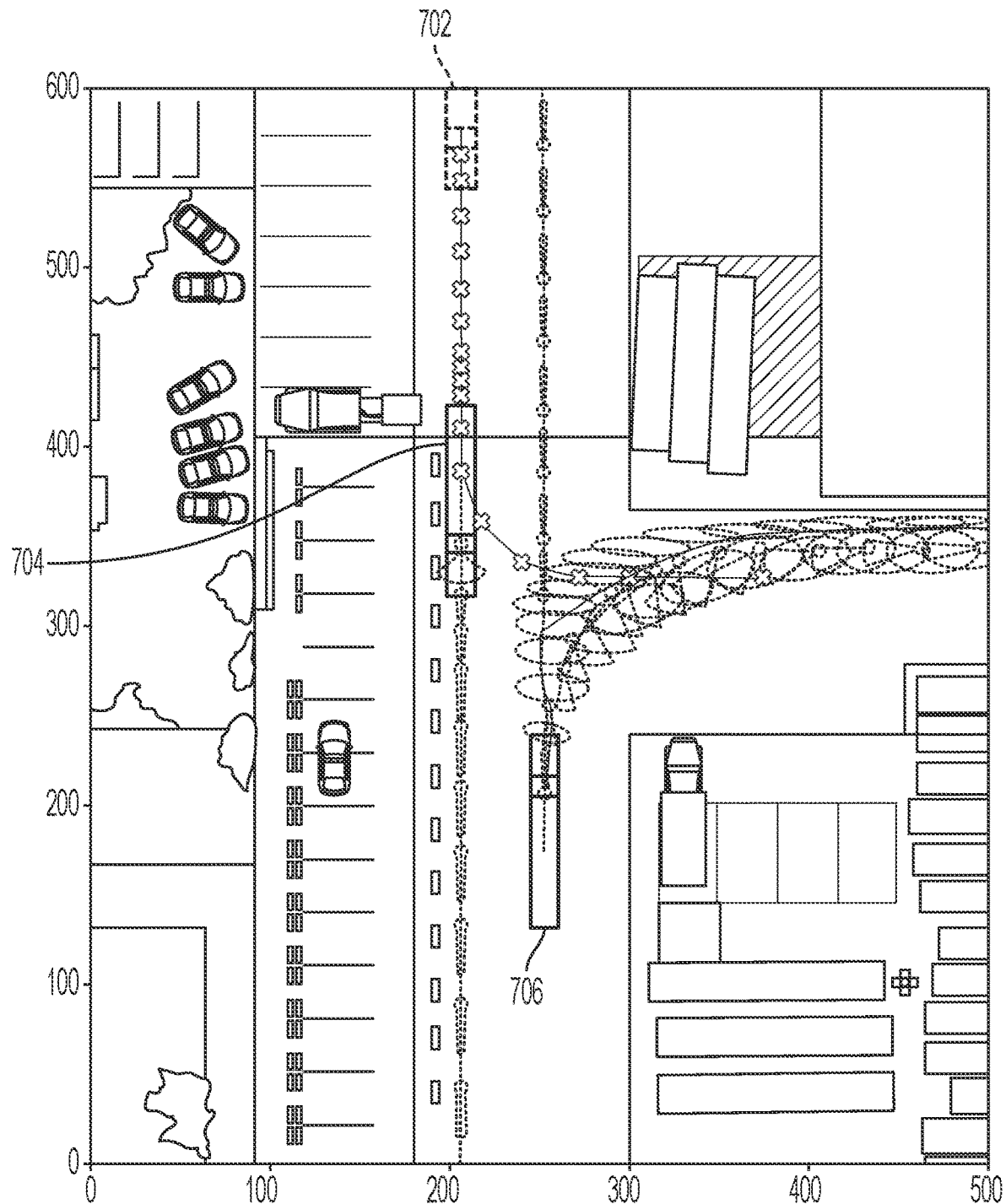
FIG. 7 illustrates an example according to an embodiment.

This example, illustrated in FIG. 7, shows that RB-RHC is practically less conservative than JCC-RHC in a simulated busy yard environment. The ego vehicle 702 wants to turn left while avoiding forward driving dynamic obstacle 704 in the front and dynamic obstacle 706 from the other side with uncertain intention. It is known in advance that the dynamic obstacle 706 has a 70% probability of turning left and a 30% probability of going straight, but its intention isn't directly observable. All vehicles are 5.0 meters in length, 2.5 meters in width tractors with 12.6 meters in length, 2.4 meters in width trailers. The ego vehicle kinematic model is assumed to be the deterministic tractor-trailer model.

The states of all three vehicles 702, 704, 706 are five dimensional: [x, y, θ, v, φ], which denotes the x, y coordinate, the tractor heading angle, the velocity, and the trailer heading angle. The control is two dimensional: [a, ψ], which denotes the tractor acceleration and the tractor steering angle. The velocity constraint, control constraints, maximum planning horizon, planning time step, replanning frequency, and the cost function are the same as in the simple intersection scenario discussed above. To be more realistic, this example chooses a smaller overall collision chance upper threshold $\alpha_0=0.00001$. For each motion pattern of each dynamic obstacle, this example manually drives ten times and uses the data to formulate the RR-GP prediction model for all three motion patterns. A total of 1000 different initial conditions were tested on JCC-FH, JCC-RHC, PCL-RHC, and RB-RHC.

Table 2 below presents the averaged results over the 1000 initial conditions for each algorithm.

TABLE 2

SIMULATION RESULTS, EXAMPLE 2, $\alpha_0 = 0.00001$

| Algorithm | Collision Rate | Navigation Cost |
|---|---|---|
| JCC-FH | 0.0 ± 0.0 | 27.178 ± 0.102 |
| JCC-RHC | 0.0 ± 0.0 | 20.829 ± 0.070 |
| PCL-RHC | 0.0 ± 0.0 | 19.203 ± 0.056 |
| RB-RHC | 0.0 ± 0.0 | 19.157 ± 0.057 |

Figure 8:
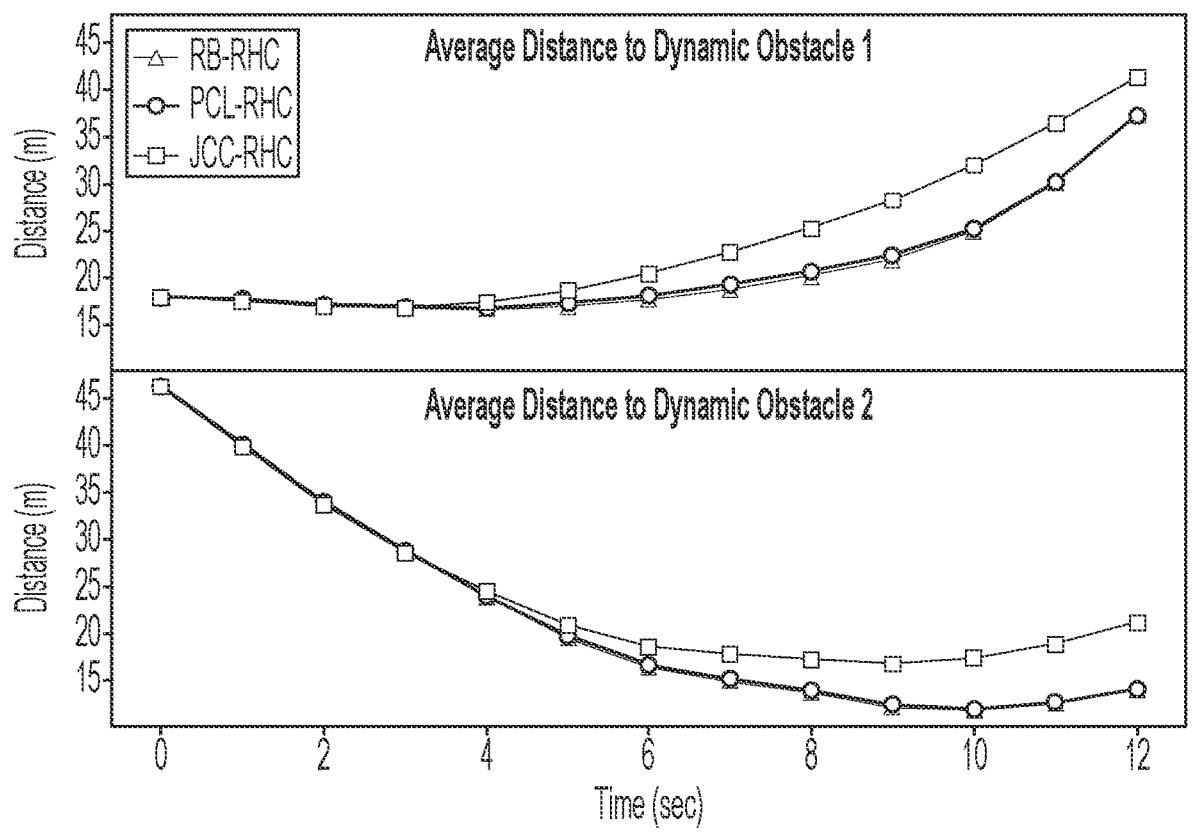
FIG. 8 illustrates results of the example of FIG. 7 according to an embodiment.

Due to the small $\alpha_0$, one observes no collision in all 1000 trials of all algorithms. In this example, the cost of RB-RHC is 8.5% less than the cost of JCC-RHC. It suggests that RB-RHC is less conservative than JCC-RHC. PCL-RHC and RB-RHC has similar cost and JCC-FH is a lot more costly than all the algorithms with replanning. Additionally, FIG. 8 shows the average distances between the ego vehicle and the dynamic obstacles at each time. While the ego vehicle remains a safe distance to dynamic obstacles using all algorithms, JCC-RHC conservatively maintains a further distance to the dynamic obstacles compared to RB-RHC and PCL-RHC.

5. Example 3: Real-World Yard Demonstrations

This example (not illustrated) demonstrates the applicability of RB-RHC in real-world safety critical environments, by testing on an autonomous class 8 truck. The autonomous truck is operated with a maximum speed of 1.15 m/s$^2$ and with a safety driver. Virtual static obstacles resemble the parked trailers in the yard and virtual dynamic obstacles resemble the other human driven yard trucks. To resemble everyday operation, this example uses a small $\alpha_0$=0.00001. The RB-RHC planner in this example replans in 20 Hz in C++ and executes the plan in the controller in MATLAB. Due to the heaviness of the truck, the controller is unable to track the planned speed profile well. Therefore, this example models the controller tracking error as ego vehicle kinematic model uncertainty within RB-RHC planner unlike the simulation examples. The truck remains a safe but not far distance to the virtual dynamic obstacles.

4. Miscellaneous; Extensions

In an embodiment, a system includes one or more devices, including one or more hardware processors, that are configured to perform any of the operations described herein and/or recited in any of the claims.

In an embodiment, one or more non-transitory computer-readable storage media store instructions that, when executed by one or more hardware processors, cause performance of any of the operations described herein and/or recited in any of the claims.

Any combination of the features and functionalities described herein may be used in accordance with an embodiment. In the foregoing specification, embodiments have been described with reference to numerous specific details that may vary from implementation to implementation. Accordingly, the specification and figures are to be regarded in an illustrative rather than a restrictive sense. The sole and exclusive indicator of the scope of the invention, and what is intended by the Applicant to be the scope of the invention, is the literal and equivalent scope of the set of claims that issue from this application, in the specific form in which such claims issue, including any subsequent correction.

5. Computer Systems and Networks

In an embodiment, techniques described herein are implemented by one or more special-purpose computing devices (i.e., computing devices specially configured to perform certain functionality). The special-purpose computing device(s) may be hard-wired to perform the techniques and/or may include digital electronic devices such as one or more application-specific integrated circuits (ASICs), field programmable gate arrays (FPGAs), and/or network processing units (NPUs) that are persistently programmed to perform the techniques. Alternatively or additionally, a computing device may include one or more general-purpose hardware processors programmed to perform the techniques pursuant to program instructions in firmware, memory, and/or other storage. Alternatively or additionally, a special-purpose computing device may combine custom hard-wired logic, ASICs, FPGAs, or NPUs with custom programming to accomplish the techniques. A special-purpose computing device may include a desktop computer system, portable computer system, handheld device, networking device, and/or any other device(s) incorporating hard-wired and/or program logic to implement the techniques.

Figure 9:
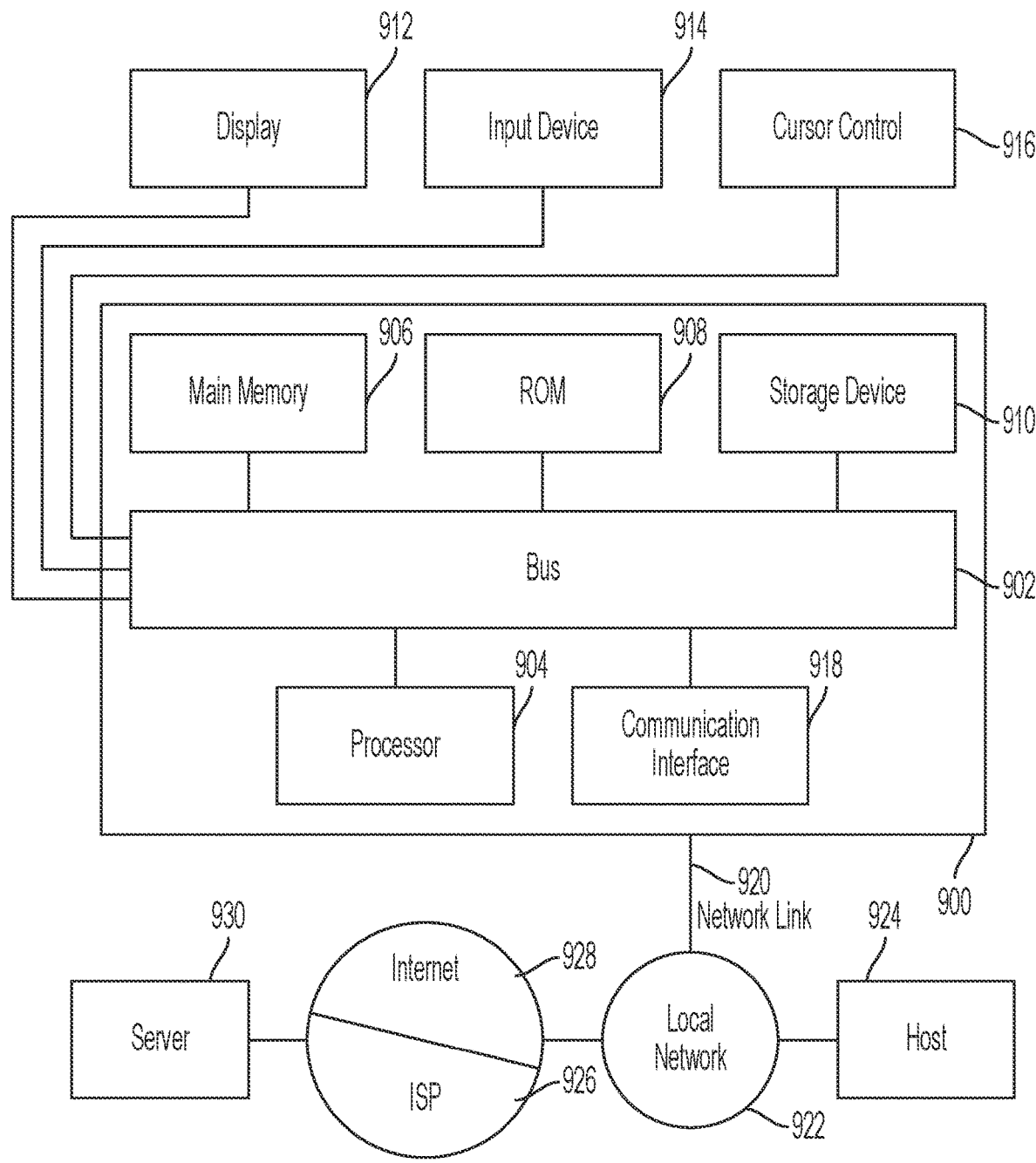
FIG. 9 is a block diagram of an example of a computer system according to an embodiment.

For example, FIG. 9 is a block diagram of an example of a computer system 900 according to an embodiment. Computer system 900 includes a bus 902 or other communication mechanism for communicating information, and a hardware processor 904 coupled with the bus 902 for processing information. Hardware processor 904 may be a general-purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in one or more non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a liquid crystal display (LCD), plasma display, electronic ink display, cathode ray tube (CRT) monitor, or any other kind of device for displaying information to a computer user. An input device 914, including alphanumeric and other keys, may be coupled to bus 902 for communicating information and command selections to processor 904. Alternatively or additionally, computer system 900 may receive user input via a cursor control 916, such as a mouse, a trackball, a trackpad, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Alternatively or additionally, computer system 9 may include a touchscreen. Display 912 may be configured to receive user input via one or more pressure-sensitive sensors, multi-touch sensors, and/or gesture sensors. Alternatively or additionally, computer system 900 may receive user input via a microphone, video camera, and/or some other kind of user input device (not shown).

Computer system 900 may implement the techniques described herein using customized hard-wired logic, one or more ASICs or FPGAs, firmware, and/or program logic which in combination with other components of computer system 900 causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. Alternatively or additionally, hard-wired circuitry may be used in place of or in combination with software instructions.

The term "storage media" as used herein refers to one or more non-transitory media storing data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape or other magnetic data storage medium, a CD-ROM or any other optical data storage medium, any physical medium with patterns of holes, a RAM, a programmable read-only memory (PROM), an erasable PROM (EPROM), a FLASH-EPROM, non-volatile random-access memory (NVRAM), any other memory chip or cartridge, content-addressable memory (CAM), and ternary content-addressable memory (TCAM).

A storage medium is distinct from but may be used in conjunction with a transmission medium. Transmission media participate in transferring information between storage media. Examples of transmission media include coaxial cables, copper wire, and fiber optics, including the wires that comprise bus 902. Transmission media may also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer may load the instructions into its dynamic memory and send the instructions over a network, via a network interface controller (NIC), such as an Ethernet controller or Wi-Fi controller. A NIC local to computer system 900 may receive the data from the network and place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922, and communication interface 918.

The received code may be executed by processor 904 as it is received, and/or stored in storage device 910, or other non-volatile storage for later execution.

In an embodiment, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link. A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (for example, a request to execute a particular application and/or retrieve a particular set of data). A server process responds by executing the requested service and/or returning corresponding data.

A computer network may be a physical network, including physical nodes connected by physical links. A physical node is any digital device. A physical node may be a function-specific hardware device. Examples of function-specific hardware devices include a hardware switch, a hardware router, a hardware firewall, and a hardware NAT. Alternatively or additionally, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (for example, a physical network). Each node in an overlay network corresponds to a respective node in the underlying network. Accordingly, each node in an overlay network is associated with both an overlay address (to address the overlay node) and an underlay address (to address the underlay node that implements the overlay node). An overlay node may be a digital device and/or a software process (for example, a virtual machine, an application instance, or a thread). A link that connects overlay nodes may be implemented as a tunnel through the underlying network. The overlay nodes at either end of the tunnel may treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources may be shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). In a hybrid cloud, a computer network includes a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, a system supports multiple tenants. A tenant is a corporation, organization, enterprise, business unit, employee, or other entity that accesses a shared computing resource (for example, a computing resource shared in a public cloud). One tenant (through operation, tenant-specific practices, employees, and/or identification to the external world) may be separate from another tenant. The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In an embodiment, in a multi-tenant computer network, tenant isolation is implemented to ensure that the applications and/or data of different tenants are not shared with each other. Various tenant isolation approaches may be used. In an embodiment, each tenant is associated with a tenant ID. Applications implemented by the computer network are tagged with tenant ID's. Additionally or alternatively, data structures and/or datasets, stored by the computer network, are tagged with tenant ID's. A tenant is permitted access to a particular application, data structure, and/or dataset only if the tenant and the particular application, data structure, and/or dataset are associated with a same tenant ID. As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants. A subscription list may indicate which tenants have authorization to access which applications. For each application, a list of tenant ID's of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels may be used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

What is claimed is:

1. One or more non-transitory computer-readable media storing instructions that, when executed by one or more processors, cause the one or more processors to perform operations comprising:
  obtaining a first risk budget constraining a first plan for an autonomous vehicle to satisfy a first objective;
  based at least on the first risk budget and the first objective, planning a first planned trajectory, over a period of time including a plurality of timesteps, of the autonomous vehicle toward the first objective, at least by:
  (a) determining a first risk cost associated with a first initial planned action to be executed over a first timestep of the plurality of timesteps, the first initial planned action corresponding to the first planned trajectory,
  (b) based at least on the first risk cost, determining whether the first planned trajectory is feasible or infeasible within the first risk budget, the first planned trajectory being feasible if a predicted amount of risk associated with the first planned trajectory is less than a first remaining risk budget, and the first planned trajectory being infeasible if the predicted amount of risk is greater than the first remaining risk budget, and
  (c) responsive to determining that the first planned trajectory is feasible within the first risk budget, executing the first initial planned action over the first timestep of the first planned trajectory, wherein the executing of the first initial planned action comprises applying a control to the autonomous vehicle;
decreasing the first risk budget by the first risk cost associated with the first initial planned action, to obtain the first remaining risk budget;
obtaining first state data corresponding to a state of the autonomous vehicle after executing the first initial planned action of the first planned trajectory; and
based at least on the first state data, the first remaining risk budget, and the first objective, planning a second trajectory of the autonomous vehicle toward the first objective.

2. The one or more non-transitory computer-readable media of claim 1, wherein the operations further comprises:
  incrementing the first remaining risk budget to cover an interval risk bound.

3. The one or more non-transitory computer-readable media of claim 1, wherein planning the second trajectory of the autonomous vehicle toward the first objective comprises:
  (a) determining a second risk cost associated with a second initial planned action of the second planned trajectory,
  (b) based at least on the second risk cost, determining whether the second planned trajectory is feasible or infeasible within the first remaining risk budget, and
  (c) responsive to determining that the second planned trajectory is infeasible within the first remaining risk budget, executing a remedial action and refraining from executing the second initial planned action.

4. The one or more non-transitory computer-readable media of claim 3, wherein the remedial action comprises an emergency stop.

5. The one or more non-transitory computer-readable media of claim 4, wherein the emergency stop is designed to satisfy a passive safety constraint associated with the autonomous vehicle, by which the autonomous vehicle is stationary in the event of a collision.

6. The one or more non-transitory computer-readable media of claim 1, wherein planning the second trajectory of the autonomous vehicle toward the first objective comprises:
  (a) determining a second risk cost associated with a second initial planned action of the second planned trajectory,
  (b) based at least on the second risk cost, determining whether the second planned trajectory is feasible or infeasible within the first remaining risk budget, and
  (c) responsive to determining that the second planned trajectory is feasible within the first remaining risk budget, executing the second initial planned action of the second planned trajectory.

7. The one or more non-transitory computer-readable media of claim 5, wherein the operations further comprise:
  decreasing the first remaining risk budget by the second risk cost associated with the second initial planned action, to obtain a second remaining risk budget;
  obtaining second state data corresponding to a state of the autonomous vehicle after executing the second initial planned action of the second planned trajectory; and
  based at least on the second state data, the second remaining risk budget, and the first objective, planning a third trajectory of the autonomous vehicle toward the first objective.

8. The one or more non-transitory computer-readable media of claim 1, wherein determining whether the first planned trajectory is feasible or infeasible within the first risk budget comprises determining whether or not, if the first initial planned action is executed, an emergency stop can be executed within the first remaining risk budget.

9. The one or more non-transitory computer-readable media of claim 1, wherein the operations further comprise:
  iteratively reducing the first remaining risk budget by risk costs associated with executed actions, until the autonomous vehicle satisfies the first objective or is unable to proceed toward the first objective within the remaining risk budget.

10. The one or more non-transitory computer-readable media of claim 1, wherein the operations further comprise:
  determining a second risk budget constraining a second plan for the autonomous vehicle to satisfy a second objective; and
  upon satisfying the first objective, increasing the second risk budget by an unallocated amount of the first remaining risk budget.

11. The one or more non-transitory computer-readable media of claim 1, wherein the operations further comprise:
  computing a safety evaluation metric for the autonomous vehicle, based at least on the first objective and an amount of the first risk budget used toward satisfying the first objective.

12. The one or more non-transitory computer-readable media of claim 1, wherein the operations further comprise:
  based at least on the first remaining risk budget, generating a safety alert.

13. The one or more non-transitory computer-readable media of claim 1, wherein:
  the first objective comprises a route plan, and executing the first initial planned action comprises defining a waypoint in a plurality of waypoints of the route plan.

14. The one or more non-transitory computer-readable media of claim 1 wherein the first objective comprises a physical destination.

15. The one or more non-transitory computer-readable media of claim 1, wherein the first risk budget constrains the first plan for the autonomous vehicle to a threshold probability of one or more kinds of safety violations over one or more of travel distance of the autonomous vehicle or travel time of the autonomous vehicle.

16. A system comprising:
  one or more processors, and
  one or more non-transitory computer-readable media storing instructions that, when executed by one or more processors, cause the one or more processors to perform operations comprising:

obtaining a first risk budget constraining a first plan for an autonomous vehicle to satisfy a first objective;

based at least on the first risk budget and the first objective, planning a first planned trajectory, over a period of time including a plurality of timesteps, of the autonomous vehicle toward the first objective, at least by:

(a) determining a first risk cost associated with a first initial planned action to be executed over a first timestep of the plurality of timesteps, the first initial planned action corresponding to the first planned trajectory, (b) based at least on the first risk cost, determining whether the first planned trajectory is feasible or infeasible within the first risk budget, the first planned trajectory being feasible if a predicted amount of risk associated with the first planned trajectory is less than a first remaining risk budget, and the first planned trajectory being infeasible if the predicted amount of risk is greater than the first remaining risk budget, and (c) responsive to determining that the first planned trajectory is feasible within the first risk budget, executing the first initial planned action over the first timestep of the first planned trajectory, wherein executing the first initial planned action comprises applying a control to the autonomous vehicle;

decreasing the first risk budget by the first risk cost associated with the first initial planned action, to obtain the first remaining risk budget;

obtaining first state data corresponding to a state of the autonomous vehicle after executing the first initial planned action of the first planned trajectory; and based at least on the first state data, the first remaining risk budget, and the first objective, planning a second trajectory of the autonomous vehicle toward the first objective.

17. The system of claim 16, the operations further comprising:
incrementing the first remaining risk budget to cover an interval risk bound.

18. The system of claim 16, planning the second trajectory of the autonomous vehicle toward the first objective comprising:
(a) determining a second risk cost associated with a second initial planned action of the second planned trajectory,
(b) based at least on the second risk cost, determining whether the second planned trajectory is feasible or infeasible within the first remaining risk budget, and
(c) responsive to determining that the second planned trajectory is infeasible within the first remaining risk budget, executing a remedial action and refraining from executing the second initial planned action.

19. The system of claim 18, wherein the remedial action comprises an emergency stop.

20. The system of claim 19, wherein the emergency stop being is designed to satisfy a passive safety constraint associated with the autonomous vehicle, by which the autonomous vehicle is stationary in the event of a collision.

21. The system of claim 16, wherein determining whether the first planned trajectory is feasible or infeasible within the first risk budget comprises determining whether or not, if the first initial planned action is executed, an emergency stop can be executed within the first remaining risk budget.

22. The system of claim 16, wherein planning the second trajectory of the autonomous vehicle toward the first objective comprises:
(a) determining a second risk cost associated with a second initial planned action of the second planned trajectory,
(b) based at least on the second risk cost, determining whether the second planned trajectory is feasible or infeasible within the first remaining risk budget, and
(c) responsive to determining that the second planned trajectory is feasible within the first remaining risk budget, executing the second initial planned action of the second planned trajectory.

23. The system of claim 22, the operations further comprising:
decreasing the first remaining risk budget by the second risk cost associated with the second initial planned action, to obtain a second remaining risk budget;
obtaining second state data corresponding to a state of the autonomous vehicle after executing the second initial planned action of the second planned trajectory; and
based at least on the second state data, the second remaining risk budget, and the first objective, planning a third trajectory of the autonomous vehicle toward the first objective.

24. The system of claim 16, the operations further comprising:
iteratively reducing the first remaining risk budget by risk costs associated with executed actions, until the autonomous vehicle satisfies the first objective or is unable to proceed toward the first objective within the remaining risk budget.

25. The system of claim 16, the operations further comprising:
determining a second risk budget constraining a second plan for the autonomous vehicle to satisfy a second objective; and
upon satisfying the first objective, increasing the second risk budget by an unallocated amount of the first remaining risk budget.

26. The system of claim 16, the operations further comprising:
computing a safety evaluation metric for the autonomous vehicle, based at least on the first objective and an amount of the first risk budget used toward satisfying the first objective.

27. The system of claim 16, the operations further comprising:
based at least on the first remaining risk budget, generating a safety alert.

28. The system of claim 16, wherein:
the first objective comprises a route plan, and
executing the first initial planned action comprises defining a waypoint in a plurality of waypoints of the route plan.

29. The system of claim 16, wherein the first objective comprising comprises a physical destination.

30. The system of claim 16, wherein the first risk budget constrains the first plan for the autonomous vehicle to a threshold probability of one or more kinds of safety violations over one or more of travel distance of the autonomous vehicle or travel time of the autonomous vehicle.

31. A method comprising:
obtaining a first risk budget constraining a first plan for an autonomous vehicle to satisfy a first objective;
based at least on the first risk budget and the first objective, planning a first planned trajectory, over a period of time including a plurality of timesteps, of the autonomous vehicle toward the first objective, at least by:
- (d) determining a first risk cost associated with a first initial planned action to be executed over a first timestep of the plurality of timesteps, the first initial planned action corresponding to the first planned trajectory,
- (e) based at least on the first risk cost, determining whether the first planned trajectory is feasible or infeasible within the first risk budget, the first planned trajectory being feasible if a predicted amount of risk associated with the first planned trajectory is less than a first remaining risk budget, and the first planned trajectory being infeasible if the predicted amount of risk is greater than the first remaining risk budget, and
- (f) responsive to determining that the first planned trajectory is feasible within the first risk budget, executing the first initial planned action over the first timestep of the first planned trajectory, wherein executing the first initial planned action comprises applying a control to the autonomous vehicle;

decreasing the first risk budget by the first risk cost associated with the first initial planned action, to obtain the first remaining risk budget;

obtaining first state data corresponding to a state of the autonomous vehicle after executing the first initial planned action of the first planned trajectory; and based at least on the first state data, the first remaining risk budget, and the first objective, planning a second trajectory of the autonomous vehicle toward the first objective.

32. The method of claim 31, further comprising:
incrementing the first remaining risk budget to cover an interval risk bound.

33. The method of claim 31, wherein planning the second trajectory of the autonomous vehicle toward the first objective comprises:
- (a) determining a second risk cost associated with a second initial planned action of the second planned trajectory,
- (b) based at least on the second risk cost, determining whether the second planned trajectory is feasible or infeasible within the first remaining risk budget, and
- (c) responsive to determining that the second planned trajectory is infeasible within the first remaining risk budget, executing a remedial action and refraining from executing the second initial planned action.

34. The method of claim 33, wherein the remedial action comprises an emergency stop.

35. The method of claim 34, wherein the emergency stop is designed to satisfy a passive safety constraint associated with the autonomous vehicle, by which the autonomous vehicle is stationary in the event of a collision.

36. The method of claim 31, wherein determining whether the first planned trajectory is feasible or infeasible within the first risk budget comprises determining whether or not, if the first initial planned action is executed, an emergency stop can be executed within the first remaining risk budget.

37. The method of claim 31, wherein planning the second trajectory of the autonomous vehicle toward the first objective comprises:
- (a) determining a second risk cost associated with a second initial planned action of the second planned trajectory,
- (b) based at least on the second risk cost, determining whether the second planned trajectory is feasible or infeasible within the first remaining risk budget, and
- (c) responsive to determining that the second planned trajectory is feasible within the first remaining risk budget, executing the second initial planned action of the second planned trajectory.

38. The method of claim 37, further comprising:
decreasing the first remaining risk budget by the second risk cost associated with the second initial planned action, to obtain a second remaining risk budget;

obtaining second state data corresponding to a state of the autonomous vehicle after executing the second initial planned action of the second planned trajectory; and based at least on the second state data, the second remaining risk budget, and the first objective, planning a third trajectory of the autonomous vehicle toward the first objective.

39. The method of claim 31, further comprising:
iteratively reducing the first remaining risk budget by risk costs associated with executed actions, until the autonomous vehicle satisfies the first objective or is unable to proceed toward the first objective within the remaining risk budget.

40. The method of claim 31, further comprising:
determining a second risk budget constraining a second plan for the autonomous vehicle to satisfy a second objective; and
upon satisfying the first objective, increasing the second risk budget by an unallocated amount of the first remaining risk budget.

41. The method of claim 31, further comprising:
computing a safety evaluation metric for the autonomous vehicle, based at least on the first objective and an amount of the first risk budget used toward satisfying the first objective.

42. The method of claim 31, further comprising:
based at least on the first remaining risk budget, generating a safety alert.

43. The method of claim 31, wherein:
the first objective comprises a route plan, and
executing the first initial planned action comprises defining a waypoint in a plurality of waypoints of the route plan.

44. The method of claim 31, wherein the first objective comprises a physical destination.

45. The method of claim 31, wherein the first risk budget constrains the first plan for the autonomous vehicle to a threshold probability of one or more kinds of safety violations over one or more of travel distance of the autonomous vehicle or travel time of the autonomous vehicle.

* * * * *

UNITED STATES PATENT AND TRADEMARK OFFICE
CERTIFICATE OF CORRECTION

PATENT NO. : 11,987,269 B2
APPLICATION NO. : 17/514197
DATED : May 21, 2024
INVENTOR(S) : Chris L. Baker et al.

Page 1 of 1

It is certified that error appears in the above-identified patent and that said Letters Patent is hereby corrected as shown below:

In the Claims

Column 31, Line 60, Claim number 20, delete "being".

Column 32, Line 57, Claim number 29, delete "comprising".

Signed and Sealed this
Twenty-fifth Day of June, 2024

Katherine Kelly Vidal
*Director of the United States Patent and Trademark Office*